United States Patent
Kang et al.

(10) Patent No.: US 12,130,664 B2
(45) Date of Patent: Oct. 29, 2024

(54) MOBILE TERMINAL AND CONTROL METHOD THEREFOR

(71) Applicant: LG ELECTRONICS INC., Seoul (KR)

(72) Inventors: Dongwan Kang, Seoul (KR); Kensin Noh, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 17/791,354

(22) PCT Filed: Jan. 7, 2020

(86) PCT No.: PCT/KR2020/000290
§ 371 (c)(1),
(2) Date: Jul. 7, 2022

(87) PCT Pub. No.: WO2021/141153
PCT Pub. Date: Jul. 15, 2021

(65) Prior Publication Data
US 2023/0038834 A1 Feb. 9, 2023

(51) Int. Cl.
*H04W 4/02* (2018.01)
*G06F 1/16* (2006.01)
(Continued)

(52) U.S. Cl.
CPC .......... *G06F 1/1624* (2013.01); *G06F 1/1652* (2013.01); *G06F 3/0481* (2013.01); *G06F 3/0488* (2013.01); *H04M 1/72448* (2021.01)

(58) Field of Classification Search
CPC .... G06F 1/1624; G06F 1/1652; G06F 3/0481; G06F 3/0488; H04M 1/72448
See application file for complete search history.

(56) References Cited

U.S. PATENT DOCUMENTS

| 9,921,714 B1* | 3/2018 | Shapiro | G06F 3/04817 |
| 2014/0211399 A1* | 7/2014 | O'Brien | G06F 1/1652 |
| | | | 29/592.1 |

(Continued)

FOREIGN PATENT DOCUMENTS

| JP | 1020170058816 | 5/2017 |
| JP | 2018535455 | 11/2018 |

(Continued)

OTHER PUBLICATIONS

PCT International Application No. PCT/KR2020/000290, Written Opinion and International Search Report dated Oct. 7, 2020, 17 pages.

*Primary Examiner* — Moustapha Diaby
(74) *Attorney, Agent, or Firm* — LEE, HONG, DEGERMAN, KANG & WAIMEY

(57) ABSTRACT

The purpose of the present invention is to provide a mobile terminal and a control method therefor, the mobile terminal enabling a user to conveniently determine execution screens of two or more applications to be displayed in a multitasking manner and a layout for the screens. According to an aspect of the present invention, provided is a mobile terminal comprising: a body; a display coupled to the body such that a display area viewed from the front of the body can be changed according to the switching between an extended display mode and a contracted display mode; and a control unit for making a control to display together recently used application information and display layout information for multitasking.

17 Claims, 30 Drawing Sheets

(51) Int. Cl.
*G06F 3/0481* (2022.01)
*G06F 3/0488* (2022.01)
*G06Q 30/02* (2023.01)
*H04M 1/72448* (2021.01)
*H04W 8/18* (2009.01)

(56) References Cited

U.S. PATENT DOCUMENTS

| | | | |
|---|---|---|---|
| 2015/0025718 A1* | 1/2015 | Miichi | B63B 49/00 |
| | | | 701/21 |
| 2015/0186024 A1 | 7/2015 | Hong et al. | |
| 2018/0188950 A1* | 7/2018 | Choi | G06F 3/04886 |

FOREIGN PATENT DOCUMENTS

| | | |
|---|---|---|
| KR | 1020190086305 | 7/2019 |
| KR | 1020190106322 | 9/2019 |

\* cited by examiner

FIG. 3
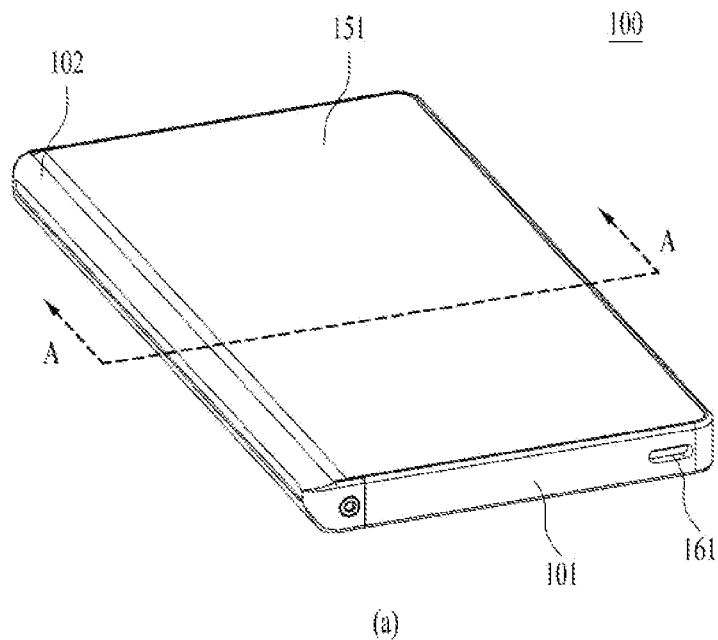
(a)
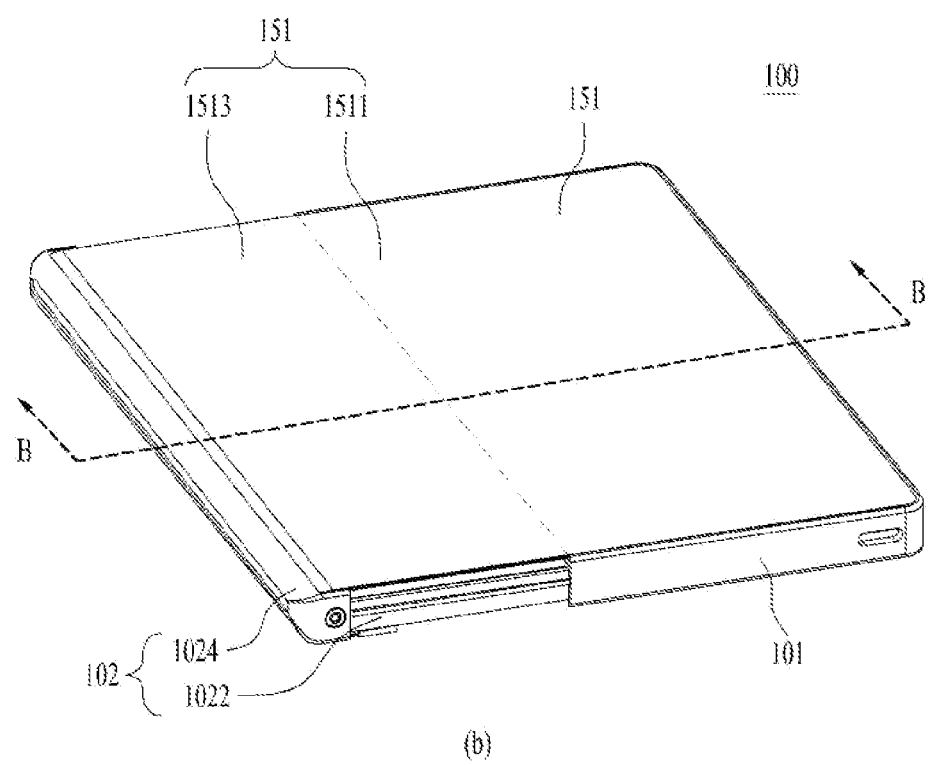
(b)

FIG. 4
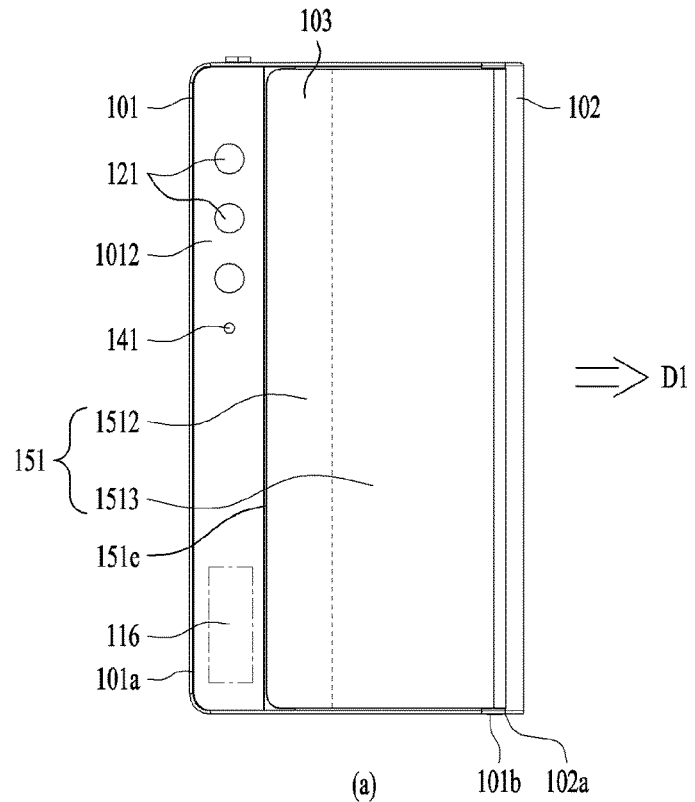
(a)
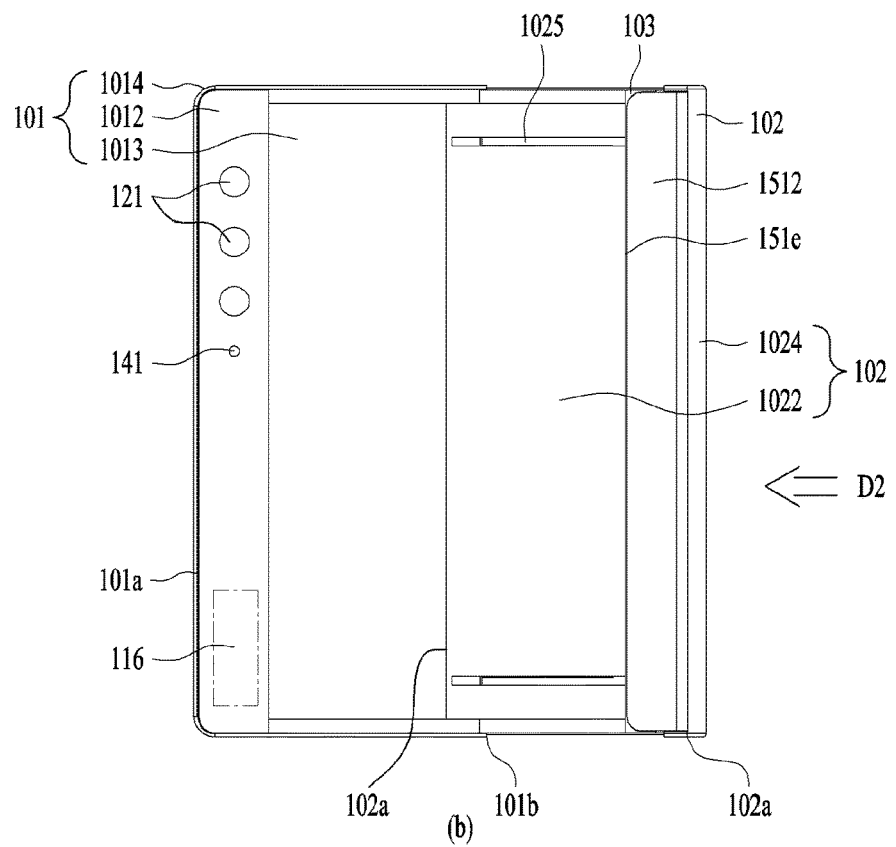
(b)

(a) (b)

FIG. 22
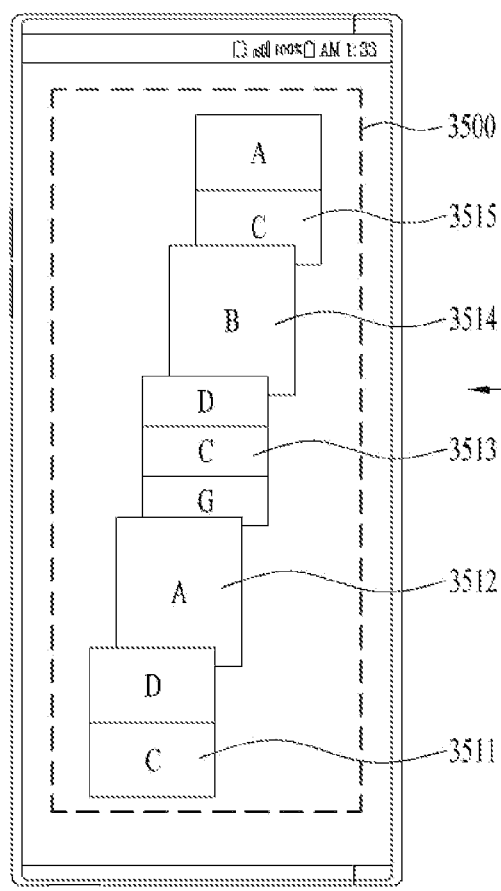 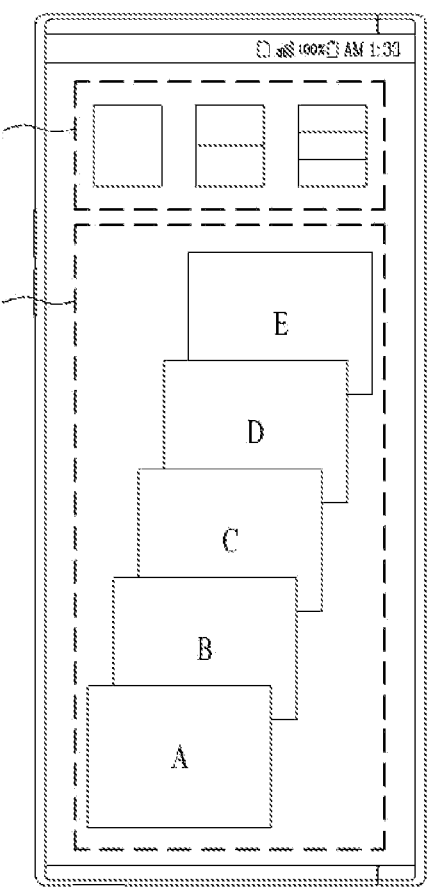
(22-1) (22-2)

MOBILE TERMINAL AND CONTROL METHOD THEREFOR

TECHNICAL FIELD

The present disclosure relates to a mobile terminal, and relates to a mobile terminal having a flexible display and a method for controlling the same.

BACKGROUND ART

A user terminal is classified into a mobile/portable terminal and a stationary terminal depending on whether it can be moved. The mobile terminal is classified into a handheld terminal and a vehicle mounted terminal depending on whether the user is capable of carrying it directly.

A display device is a device having a function of receiving, processing, and displaying an image that a user is capable of watching. The display device receives, for example, a broadcast selected by a user among broadcast signals transmitted from a broadcast station, separates a video signal from the received signal, and displays the separated video signal on a display again.

Recently, due to the development of broadcasting technology and network technology, functions of the display device have been considerably diversified, and performance of the device has been improved accordingly. That is, display devices have been developed to provide not only broadcast content but also various other content to users. For example, the display device may provide not only a program received from a broadcasting station, but also game play, music listening, Internet shopping, user customized information, and the like using various applications. In order to perform such extended functions, the display device is basically connected to other devices or networks using various communication protocols, and may provide a user with ubiquitous computing. That is, the display device has evolved into a smart device that enables connectivity to a network and always-on computing.

In recent years, a flexible display that has sufficient elasticity and is greatly deformable has been developed. A display size of the mobile terminal may be varied using the deformable property of the flexible display.

In recent mobile terminals, multitasking in which two or more applications are simultaneously executed is possible. As the multitasking is performed, execution screens of the two or more applications may be displayed together on the display of the mobile terminal.

DISCLOSURE

Technical Problem

An object of an embodiment of the present disclosure is to provide a mobile terminal and a control method therefor for allowing a user to conveniently determine execution images for two or more applications to be displayed in a multitasking way and a layout for the execution images.

Technical Solution

According to an aspect of the present disclosure, a mobile terminal includes a body, a display coupled to the body to allow a display area seen from a front of the body to be variable as being switched between an extended display mode and a contracted display mode, and a controller configured to display information on a recently used application with display layout information for multitasking.

The body may include a first frame, and a second frame to be extended from the first frame and to be contracted to the first frame. The display may include a flexible display surrounding the front, side, and back surfaces of the body. The mobile terminal may operate in the extended display mode as the second frame is extended and may operate in the contracted display mode as the second frame is contracted.

According to another aspect of the present disclosure, a control method of a mobile terminal including a body, and a display coupled to the body to allow a display area seen from a front of the body to be variable as being switched between an extended display mode and a contracted display mode includes receiving a user command for displaying information on a recently used application, and performing control the information on the recently used application with the display layout information for multitasking.

Advantageous Effects

An effect of a mobile terminal and a control method thereof according to the present disclosure will be described below.

According to at least one of embodiments of the present disclosure, a user may be advantageously and conveniently determine execution images of two or more applications to be displayed in a multitasking way and a layout for the execution images.

According to at least one of embodiments of the present disclosure, a layout for execution images of two or more applications displayed in a multitasking way may be conveniently changed.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 3 shows perspective views respectively illustrating a first state and a second state viewed from one side of a mobile terminal according to an embodiment;

FIG. 4 shows rear face views respectively illustrating a first state and a second state of a mobile terminal according to an embodiment;

FIG. 22 illustrates a front display area in a contracted display mode according to an embodiment of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
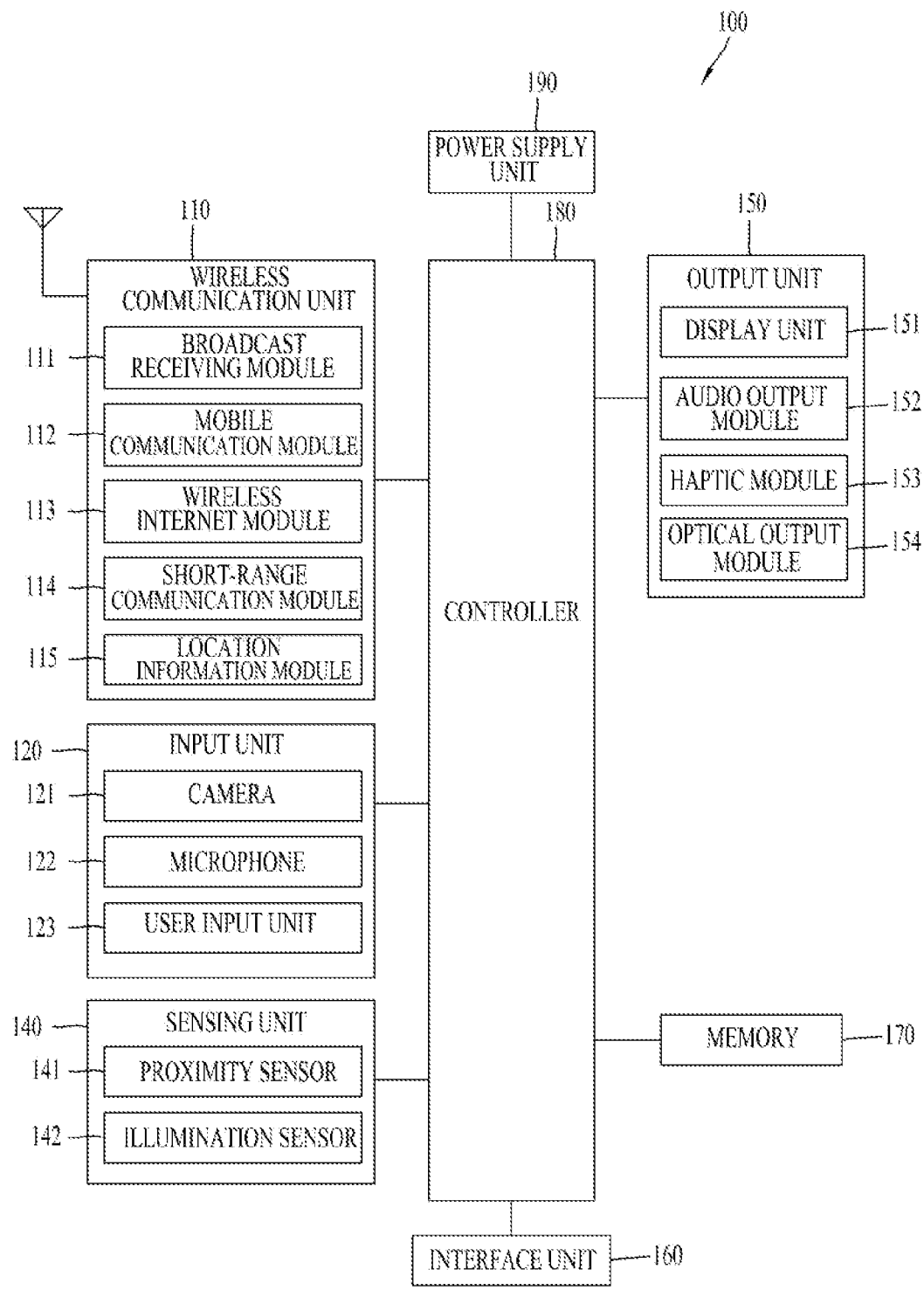
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in the memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
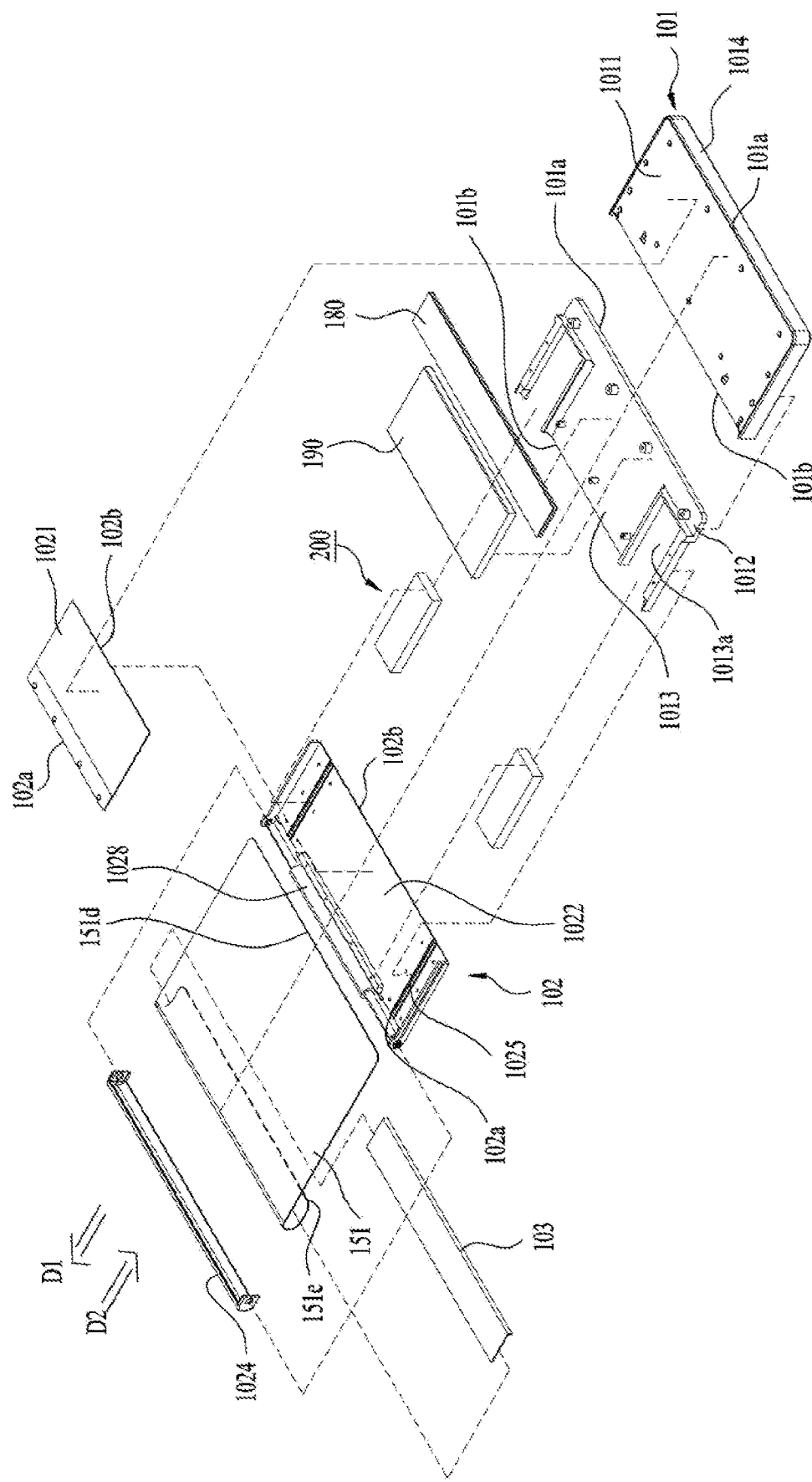
FIG. 2 is an exploded perspective view of a mobile terminal according to an embodiment.
Figure 5:
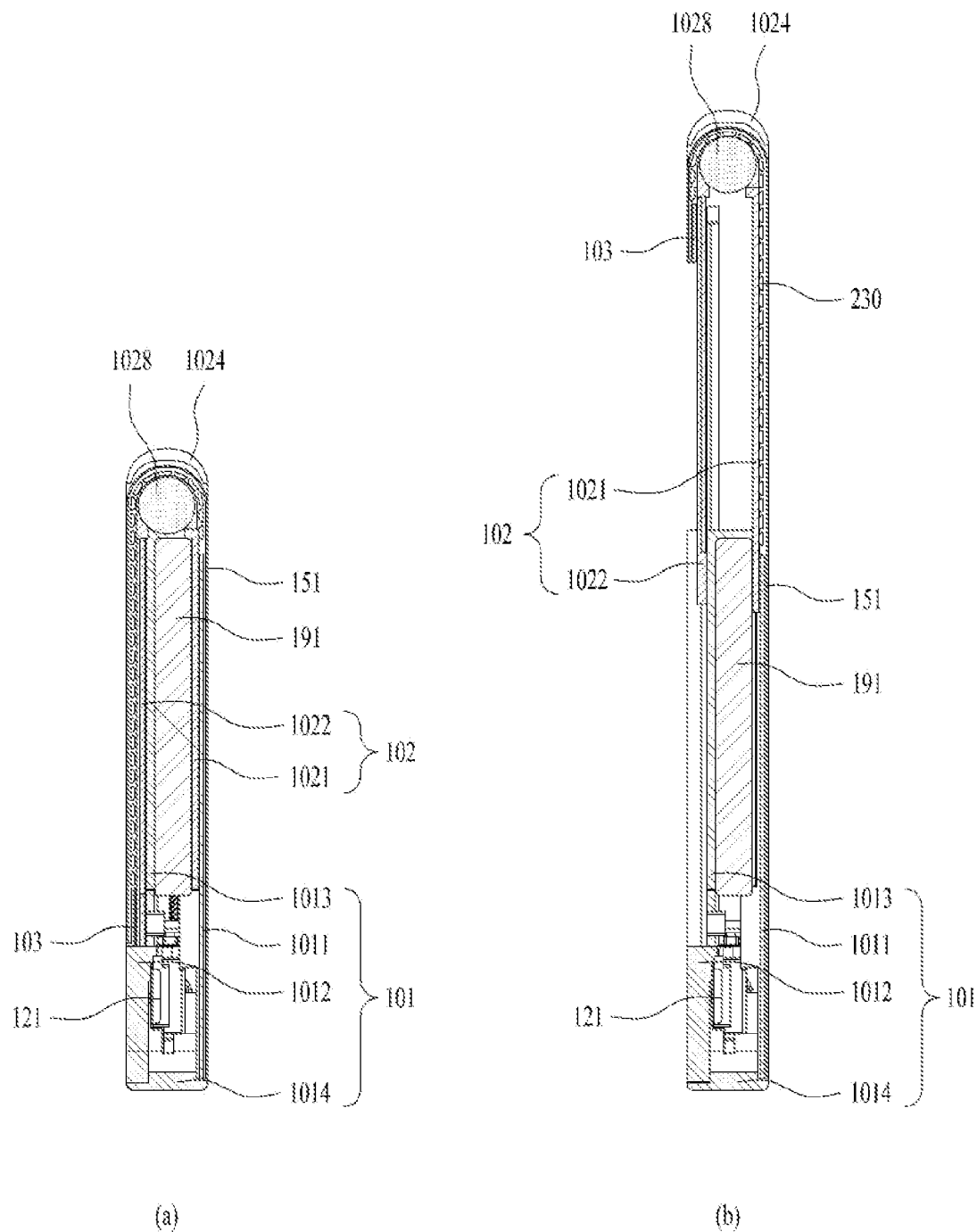
FIG. 5 shows cross-sectional views respectively taken along a line A-A and a line B-B of FIG. 3.

FIG. 2 is an exploded perspective view of a mobile terminal according to an embodiment. Further, FIG. 3 shows perspective views respectively illustrating a first state and a second state viewed from one side of a mobile terminal according to an embodiment. Further, FIG. 4 shows rear face views respectively illustrating a first state and a second state of a mobile terminal according to an embodiment. Further, FIG. 5 shows cross-sectional views respectively taken along a line A-A and a line B-B of FIG. 3. In these drawings, FIGS. 3 (a), 4 (a), and 5 (a) show a first state of the mobile terminal, and FIGS. 3 (b), 4 (b), and 5 (b) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3 (a) into the second state as shown in FIG. 3 (b) by enlarging a screen thereof. In the second state, an area of the front face of the display unit 151 is enlarged, and an area of a rear face of the display unit 151 is reduced as shown in FIG. 4 (b). That is, the display unit 151 positioned on a rear face of the mobile terminal 151 in the first state moves to the front face of the mobile terminal 100 in the second state.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to third frames 101 to 103 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, e.g., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display unit 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit 151. On the other hand, an additional auxiliary camera is required to be disposed on the front face of the terminal in order for the user to capture himself or herself while viewing himself or herself through the display unit 151.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second rear portion 1013 of the first frame 101 may be covered by the display unit 151, but may be disposed on the front face of the display unit 151 using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and should not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension should be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display unit 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (e.g., the first direction D1 or the second direction D2) relative to the second frame 102. The roller 1028 may guide such movement while rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

Because the side face is rolled by the roller, the side face is bent with the predetermined curvature, and an inner face of the side frame may include a curved face corresponding to the curvature of the side face.

The first region and the second region correspond to the fixed portion described above. The third region corresponds to the variable portion described above, and may vary in position depending on the state of the mobile terminal. Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (e.g., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 should move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may is be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. The first region and the second region corresponds to the fixed portion described above, and the third region corresponds to the variable portion described above Such configuration of the display unit 151 will be described in more detail below. The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (b), the slot 1025 extending in the lateral direction (e.g, the direction perpendicular to the longitudinal direction of the mobile terminal 100) to the second frame 102, that is, to the third rear portion 1022 is defined. Further, the third frame 103 may move along the slot 1025. In FIG. 4 (b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

Hereinafter, with reference to FIGS. 6 to 27, an embodiment in which two or more application execution images are displayed together on a mobile terminal as described above will be described.

Hereinafter, the "extended (or enlarged) display mode" may refer to a mode in which the mobile terminal displays a lock screen, a home screen, or content (e.g., an application execution image) in the state in which a second frame is extended from a first frame.

Hereinafter, the "contracted (or retracted) display mode)" may refer to a mode in which the mobile terminal displays a lock screen, a home screen, or content (e.g., an application execution image) in the state in which the second frame is contracted to the first frame.

Hereinafter, the "front display area" in the extended display mode may refer to an area including a first region 1511 and a third region 1513 as described above when the mobile terminal is in the extended display mode.

Hereinafter, the "front display area" in the contracted display mode may refer to an area including the first region 1511 when the mobile terminal is in the contracted display mode.

That is, the front display area in the extended display mode may be wider than the front display area in the contracted display mode.

The following embodiment of the present disclosure in which two or more application execution images are displayed together according to the extended display mode and the contracted display mode is not necessarily applied to the mobile terminal formed by combining the first frame and the second frame as described above with reference to FIGS. 2 to 5. For example, needless to say, the embodiment of the present disclosure may also be applied to any type of mobile terminal as long as a display area is configured to be variable like a foldable form factor, a slide form factor, or a rollable form factor.

Figure 6:
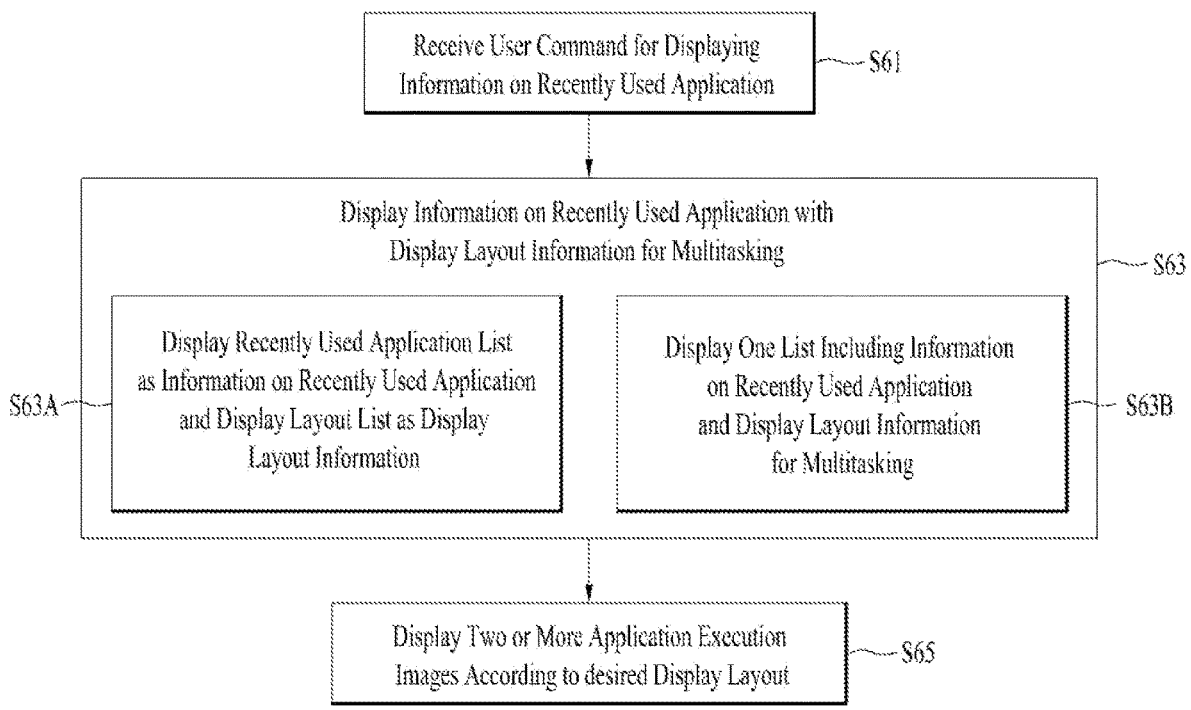
FIG. 6 is a flowchart of layout setting of two or more displayed application execution images according to an embodiment of the present disclosure.

Hereinafter, with reference to FIGS. 6 to 12, layout setting of two or more displayed application execution images according to an embodiment of the present disclosure will be described. FIG. 6 is a flowchart of layout setting of two or more displayed application execution images according to an embodiment of the present disclosure. FIGS. 7 to 11 show a front display area in an extended display mode according to an embodiment of the present disclosure. FIG. 12 illustrates display layouts according to an embodiment of the present disclosure.

Figure 7:
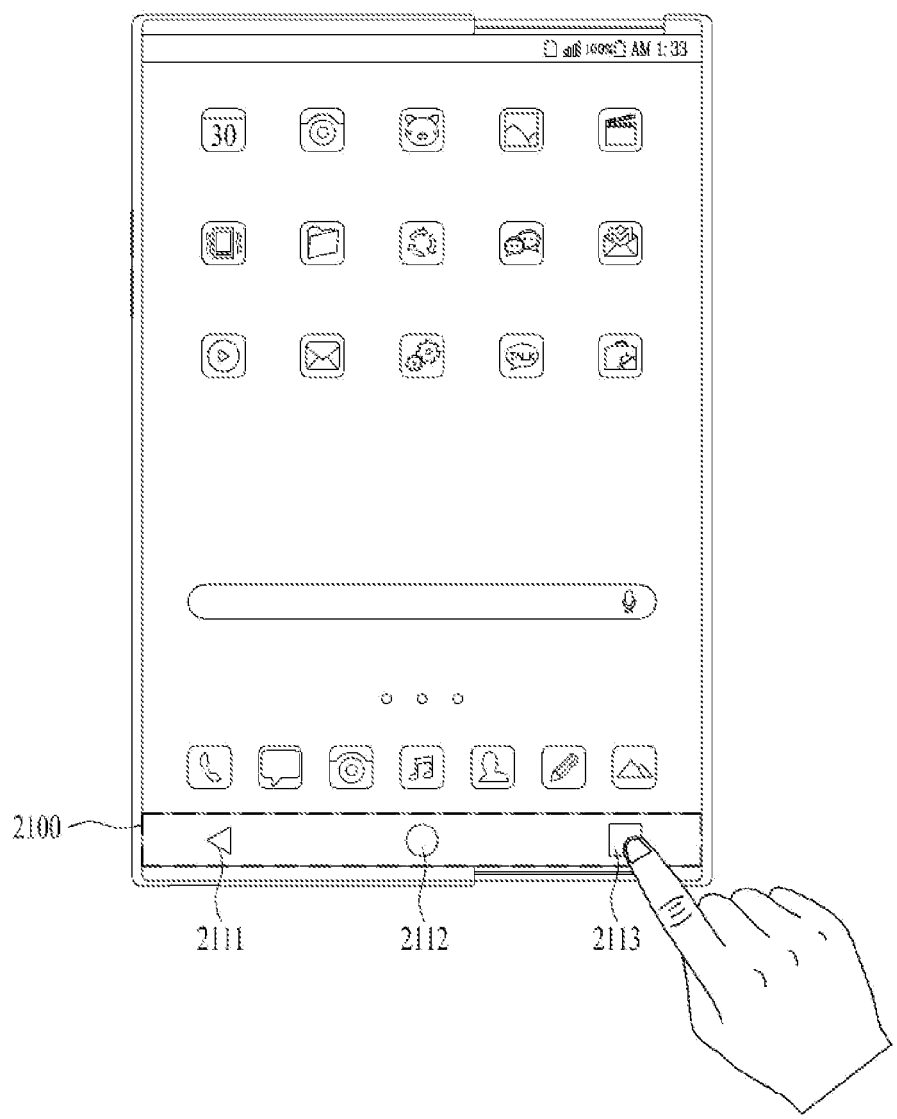
FIGS. 7 to 11 show a front display area in an extended display mode according to an embodiment of the present disclosure.

As shown in FIG. 7, a home screen may be displayed on the front display area of the extended display mode of the mobile terminal 100. The home screen may refer to an image displayed in the state in which no application is executed in a foreground when the mobile terminal is unlocked. A plurality of application icons (and/or widgets) preset by a user may be displayed on the home screen. The plurality of preset application icons may be divided and grouped to constitute a plurality of pages, and may be displayed while being switched one page at a time whenever a preset touch gesture is performed on the front display area.

A navigation bar may be displayed in a lower region 2100 on the home screen. A previous button 2111, a home button 2112, a recent button 2113, and the like may be displayed in the navigation bar. The previous button 2111 may be a button for switching the currently used image to a previous image. The home button 2112 may be a button for switching the currently used image to an initial image (e.g., a home screen). The recent button 2113 may be a button for displaying information on a recently used application in the mobile terminal.

The navigation bar may be displayed not only on the home screen, but also on other screens (e.g., application execution image).

A user command for displaying information of the recently used application may be input in the mobile terminal [S61]. The user command may be selected by touching the recent button 2113 displayed on the home screen or the other screens.

Then, the controller 180 may also display the display layout information for multitasking while displaying information on the recently used application [S63].

In operation S63, the controller 180 may perform control to display a display layout list as the display layout information while displaying as information on the recently used application [S63A].

Alternatively, in operation S63, the controller 180 may perform control to display one list including the information on the recently used application and the display layout information for multitasking [S63B].

Then, when two or more application execution images are selected through the recently used application list and a desired display layout is selected through the display layout list, the controller 180 may display two or more application execution images according to the desired display layout in a multitasking way [S65].

When the two or more application execution images and the desired display layout are selected through the one list, the controller 180 may display the two or more application execution images according to the desired display layout in a multitasking way [S65].

Hereinafter, with reference to FIGS. 8 to 11, display of two or more application execution images according to the desired display layout in a multitasking way through operation S63A will be described.

Figure 8:
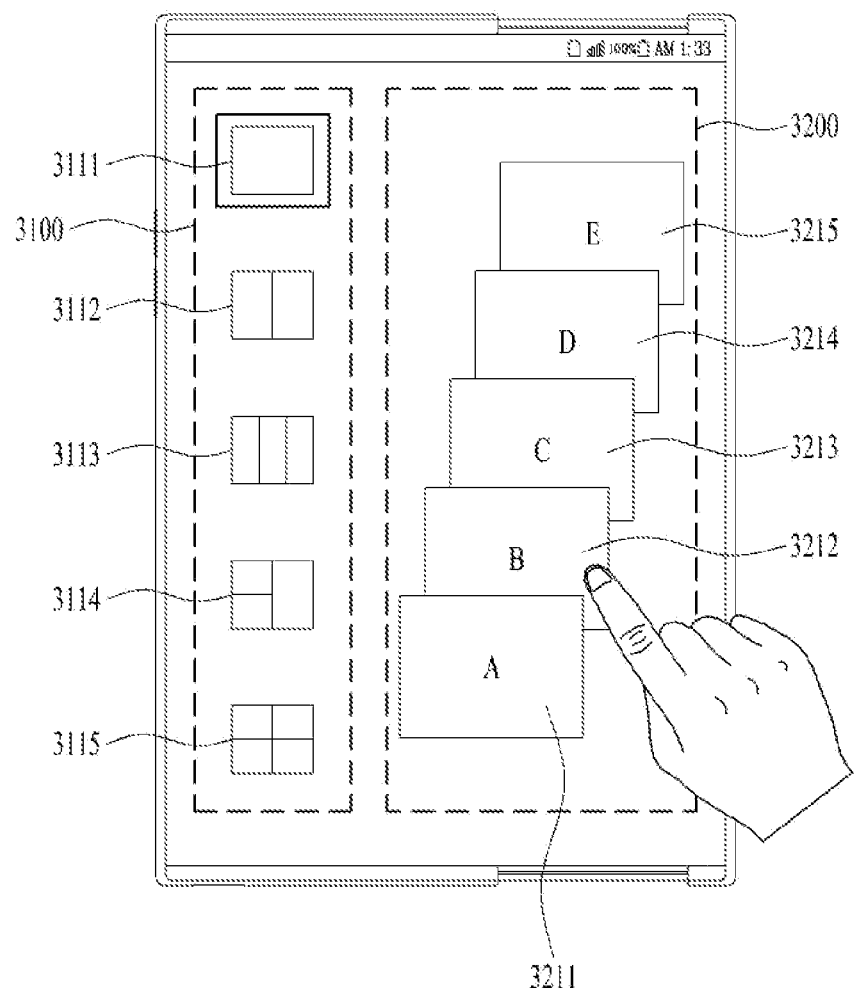

As shown in FIG. 8, in operation S63A, the controller 180 may perform control to display the display layout list 3100 as the display layout information while displaying the recently used application list 3200 as information on the recently used application. That is, the display layout list 3100 may be simultaneously displayed as a separate list from the recently used application list 3200.

The display layout list 3100 may list a first layout indicator 3111 for displaying one application execution image, a second layout indicator 3112 for displaying two application execution images, a third layout indicator 3113 and a fourth layout indicator 3114 for displaying three application execution images, and a fifth layout indicator 3115 for displaying four application execution images. A layout indicator for displaying more application execution images and/or a layout indicator for displaying the same number of application execution images according to different arrangements may be displayed.

Considering that operation S63A is performed while the mobile terminal 100 is in the extended display mode, the two or more application execution images controller 180 may sort only an indicator for a display layout suitable for the extended display mode in the display layout list 3100 and may also display the indicator.

In the recently used application list 3200, first to fifth applications 3211, 3212, 3213, 3214, and 3215, which have been recently used in the mobile terminal 100, may be sequentially displayed in the foreground in a time sequence.

In the display layout list 3100, the first layout indicator 3111 may be selected as a default. The first layout indicator 3111 may be a layout for displaying only an execution image of one application as an entire image in the front display area.

Figure 9:
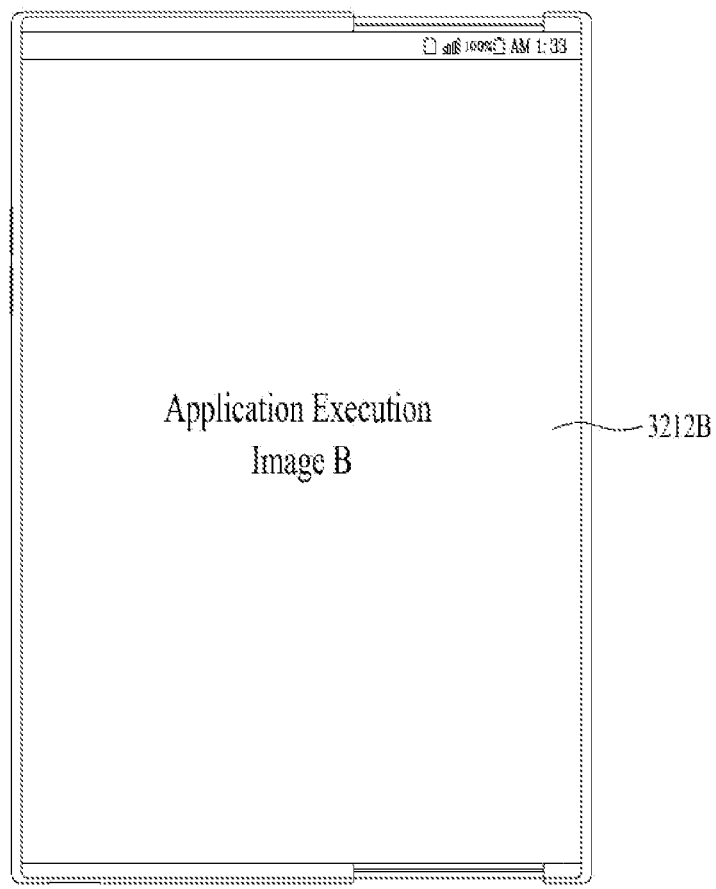

In this state, when one application in the recently used application list 3200, e.g., the second application 3212 is touched and selected, the controller may perform control to display a second application execution image 3212B in the front display area of the extended display mode in a non-multitasking way according to a display layout corresponding to the first layout indicator 3111 as shown in FIG. 9. For example, the second application execution image 3212B may be displayed as an entire image.

Figure 10:
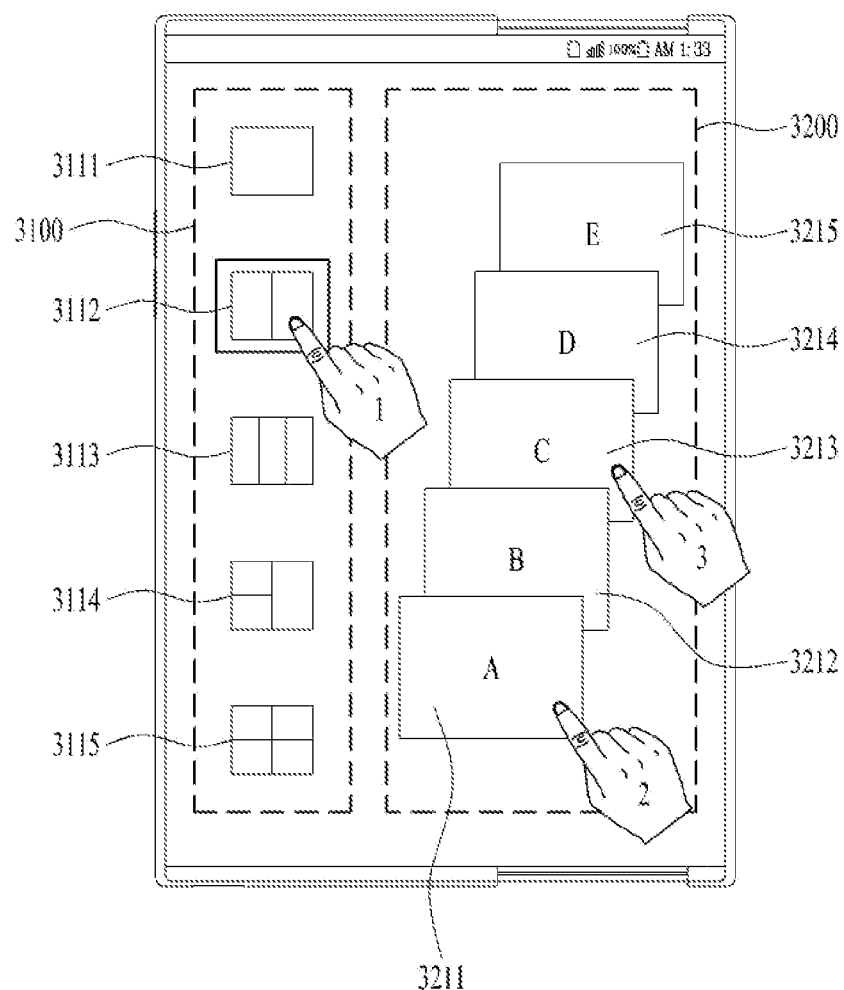

As shown in FIG. 10, after the second layout indicator 3112 is touched and selected in the display layout list 3100, the first application 3211 and the third application 3213 may be sequentially touched and selected in the recently used application list 3200.

Figure 11:
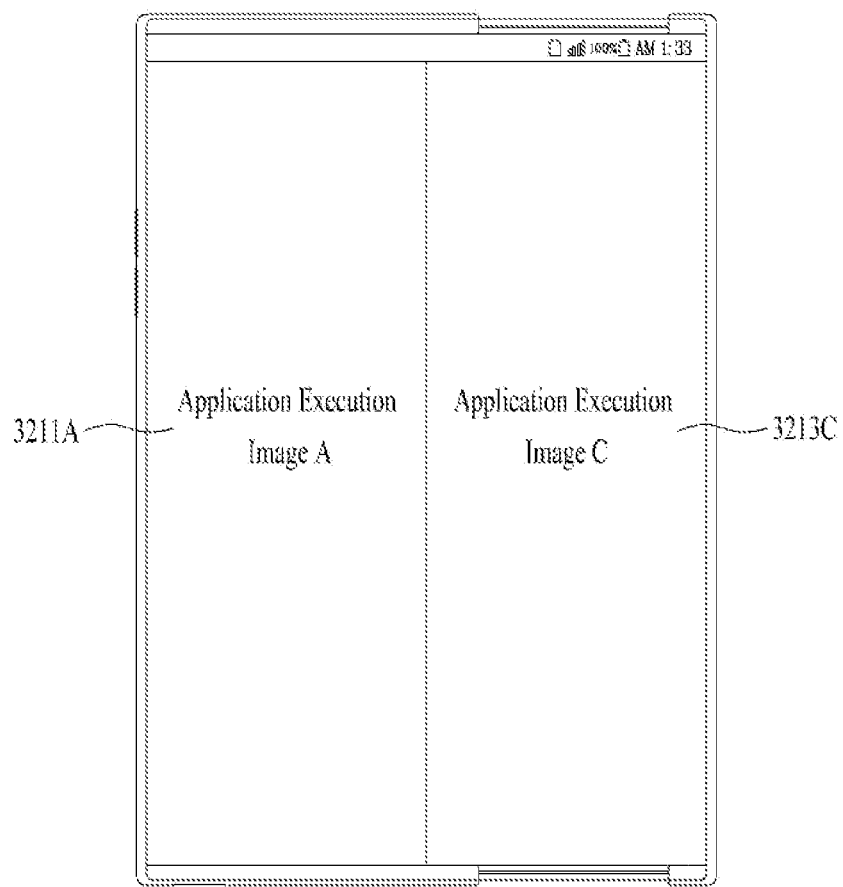
Figure 12:
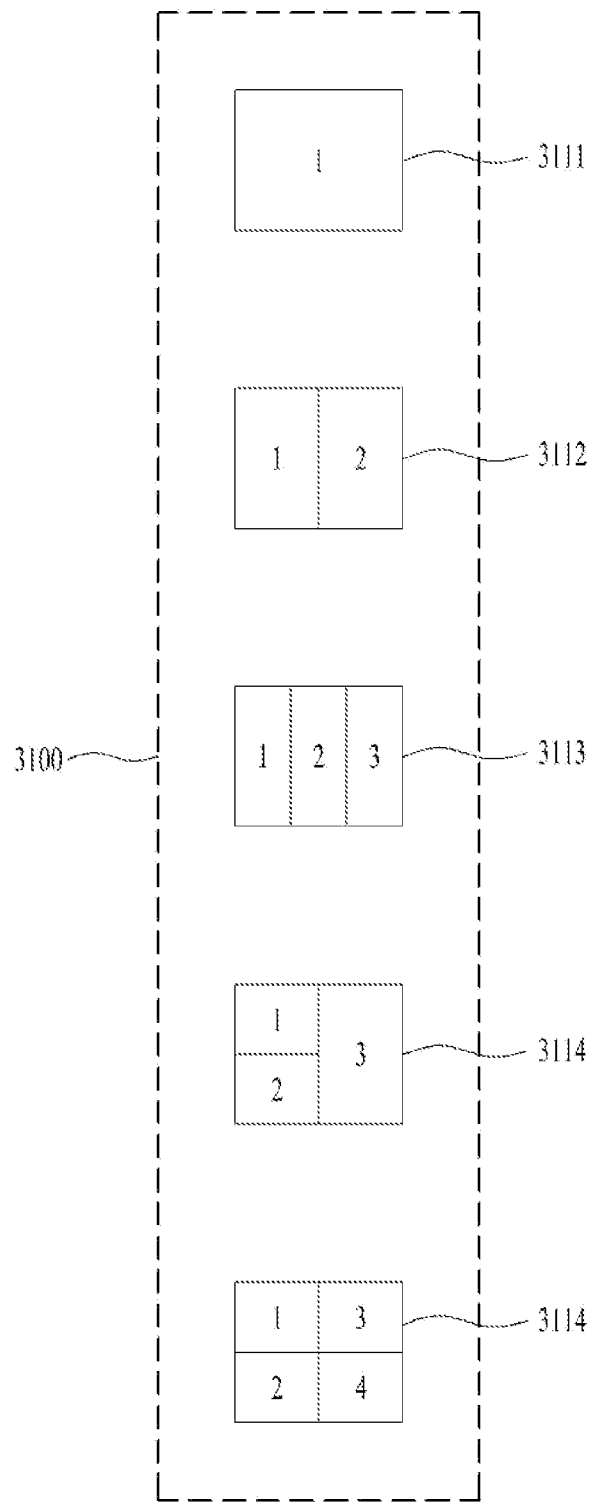
FIG. 12 illustrates display layouts according to an embodiment of the present disclosure.

Then, as shown in FIG. 11, the controller 180 may perform control to display a first application execution image 3211A and a third application execution image 3213C in the front display area of the extended display mode according to a display layout corresponding to the second layout indicator 3112. That is, after the front display area is divided into a left area and a right area according to the display layout corresponding to the second layout indicator 3112, the first application execution image 3211A that is first touched and selected may be displayed in the left area, and then the third application execution image 3213C that is later selected may be displayed in the right area.

As shown in FIG. 12, in each of the layout indicators 3111, 3112, 3113, 3114, and 3115 of the display layout list 3100, a position at which an execution image of an application selected from the recently used application list 3200 is to be displayed according to the selection order may also be displayed as a number, which will also be applied to the following description.

Figure 13:
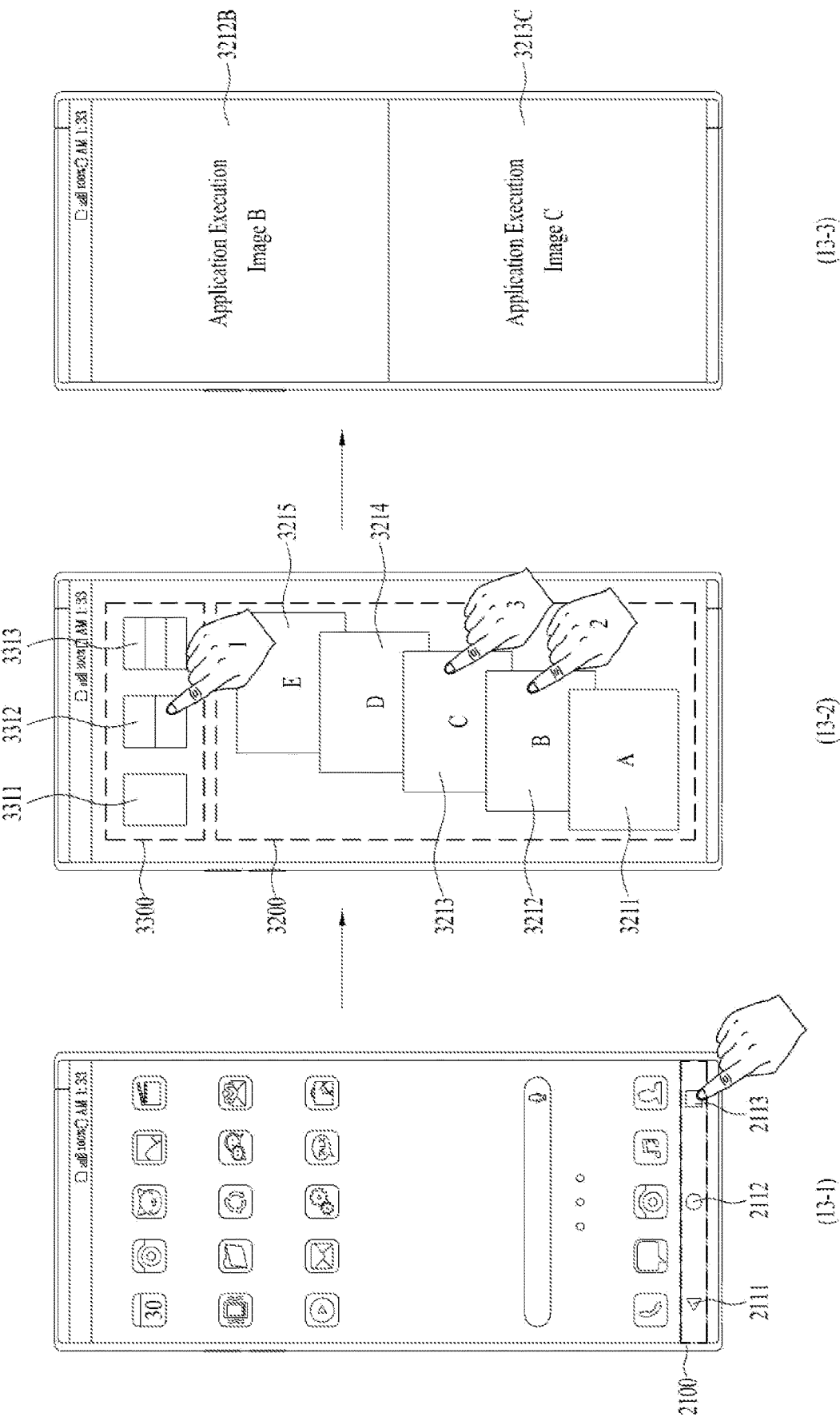
FIG. 13 is a diagram showing a front display area in a contracted display mode according to an embodiment of the present disclosure.

Thus far, the case in which operations S61, S63A, and S65 are performed when the mobile terminal 100 is in the extended display mode will be described. Hereinafter, with reference to FIG. 13, the case in which operations S61, S63A, and S65 are performed when the mobile terminal 100 is in the contracted display mode will be described. FIG. 13 illustrates a front display area in a contracted display mode according to an embodiment of the present disclosure.

As shown in (13-1) of FIG. 13, a home screen may be displayed in the front display area of the contracted display mode of the mobile terminal 100.

As described above, a navigation bar may be displayed in the lower region 2100 on the home screen, and the previous button 2111, the home button 2112, the recent button 2113, and the like may be displayed in the navigation bar.

A user command for displaying information of the recently used application may be input in the mobile terminal [S61]. The user command may be selected by touching the recent button 2113 displayed on the home screen or the other screens.

As shown in (13-2) of FIG. 13, the controller 180 may perform control to display a display layout list 3300 as the display layout information while displaying the recently used application list 3200 as information on the recently used application [S63A].

Considering that operation S63A is performed while the mobile terminal 100 is in the contracted display mode, the controller 180 may sort only indicators 3311, 3312, and 3313 for a display layout suitable for the contracted display mode in the display layout list 3300 and may also display the indicators 3311, 3312, and 3313.

The recently used application list 3200 is the same as the above description.

After one layout indicator 3312 is touched and selected in the display layout list 3300, the second application 3212 and the third application 3213 may be sequentially touched and selected in the recently used application list 3200.

Then, as shown in (13-3) of FIG. 13, the controller 180 may perform control to display the second application execution image 3212B and the third application execution image 3213C in the front display area of the extended display mode according to a display layout corresponding to the selected layout indicator 3312. That is, after the front display area is divided into an upper area and a lower area according to the display layout corresponding to the selected layout indicator 3312, the second application execution image 3212B that is first touched and selected may be displayed in the upper area, and the third application execution image 3213C that is later touched and selected may be displayed in the lower area.

Figure 14:
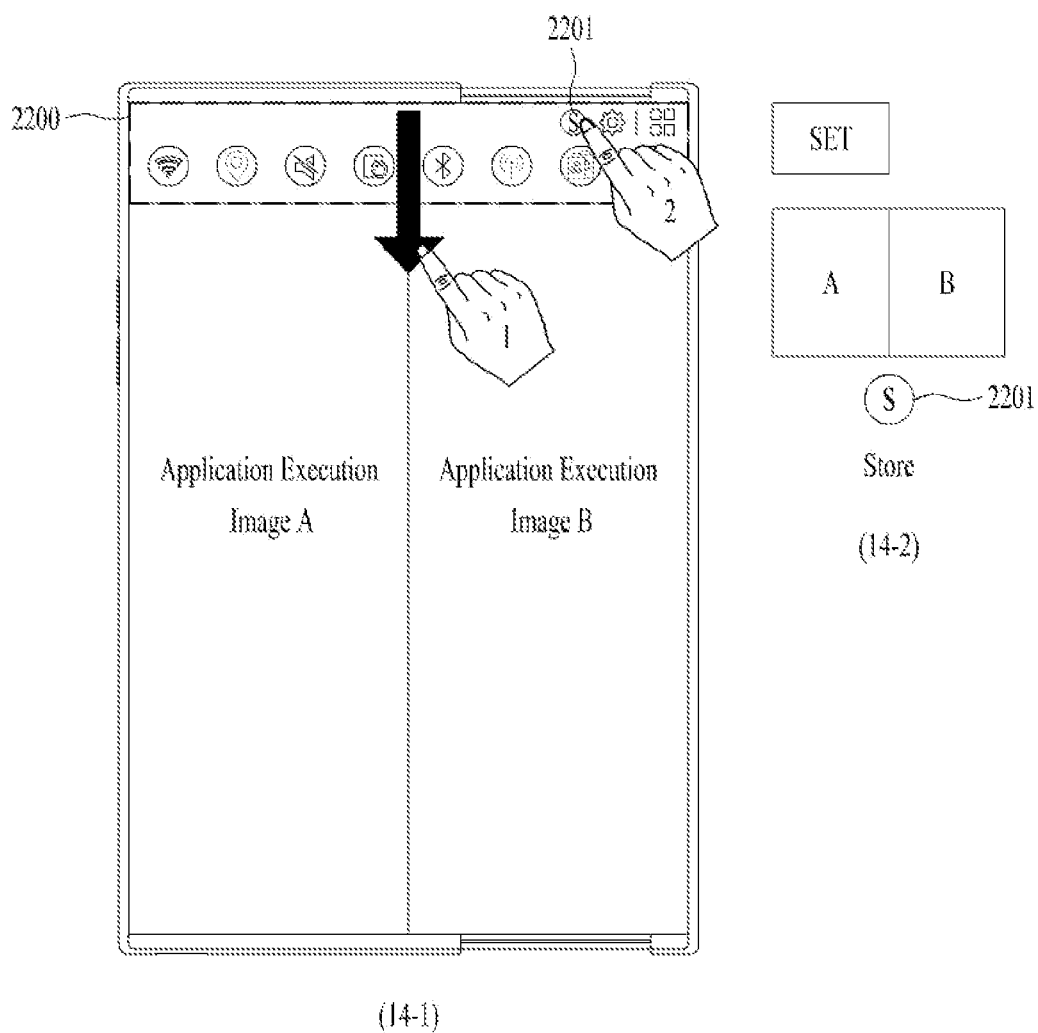
FIGS. 14 and 15 show a stored multitasking application set according to an embodiment of the present disclosure.
Figure 15:
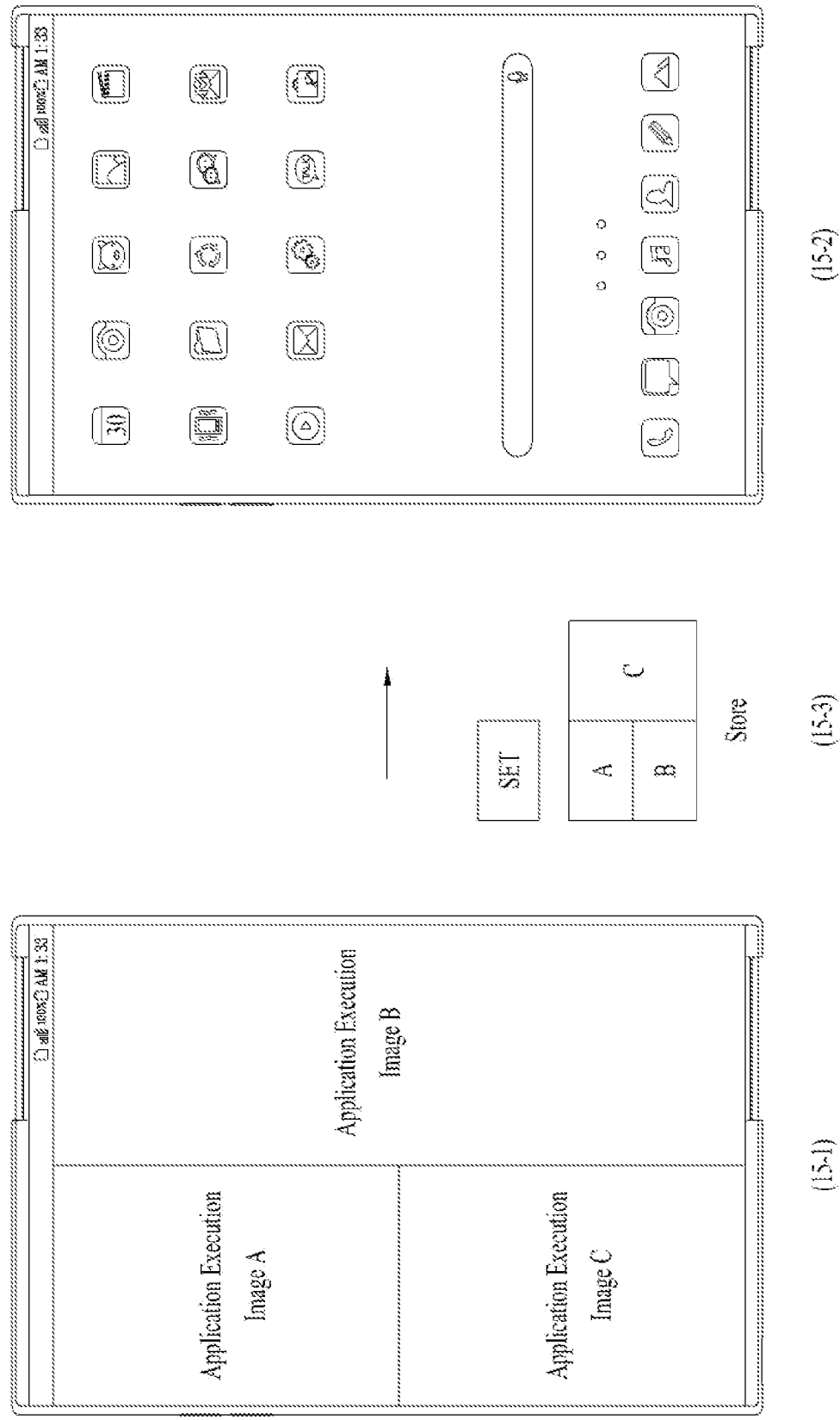
Figure 16:
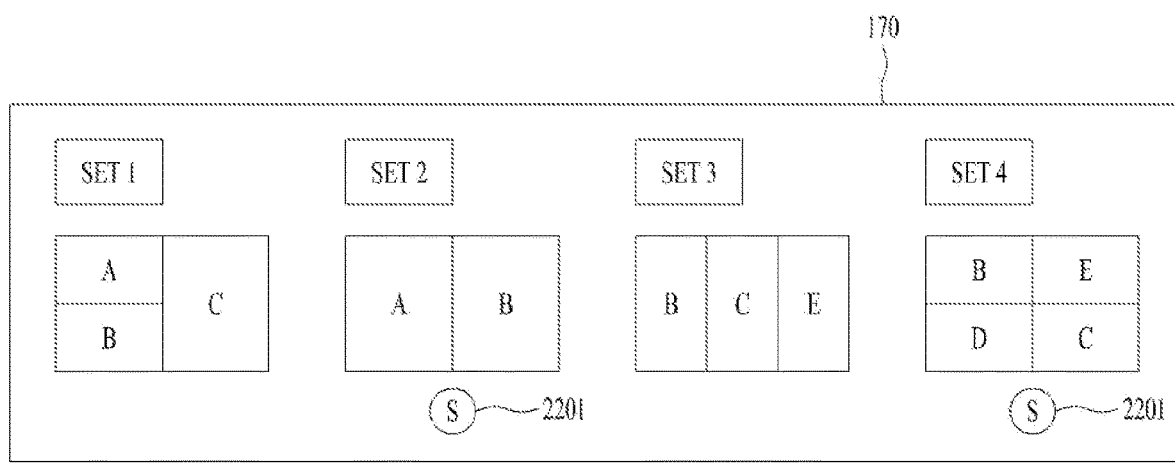
FIG. 16 shows a multitasking application set list according to an embodiment of the present disclosure.

Hereinafter, with reference to FIGS. 14 to 21, display of two or more application execution images according to the desired display layout in a multitasking way through operation S63B will be described. FIGS. 14 and 15 show a stored multitasking application set according to an embodiment of the present disclosure. FIG. 16 shows a multitasking application set list according to an embodiment of the present disclosure. FIGS. 17 to 21 show a front display area in an extended display mode according to an embodiment of the present disclosure.

First, with reference to FIGS. 14 and 15, the multitasking application set for operation S63B will be described.

As shown in (14-1) of FIG. 14, when two application execution images are simultaneously displayed according to a predetermined display layout in a multitasking way while the mobile terminal 100 is in the extended display mode, a notification window 220 may be displayed according to a predetermined user command. The predetermined user command may be a touch drag or flicking gesture from the upper edge downward when the notification window 2200 is displayed in the upper area of the front display area.

Various menus or icons for various settings (e.g., WiFi setting, Bluetooth setting, or sound/vibrate/silent setting) of the mobile terminal may be generally displayed in the notification window 2200.

According to an embodiment of the present disclosure, a multitasking application set setting icon 2201 may be displayed in the notification window 2200. The multitasking application set setting icon 2201 may not be necessarily displayed in the notification window 2200, and may be displayed in at a different position or a different window on the front display area according to another user command. While the mobile terminal simultaneously displays two or more application execution images in a multitasking way according to a predetermined display layout, only when a notification window 2020 is called, the multitasking application set setting icon 2201 may be displayed within the notification window 2020. Needless to say, the multitasking application set setting icon 2201 may always be displayed within the notification window 2020.

As shown in (14-2) of FIG. 14, when the multitasking application set setting icon 2201 is touched and selected, the controller 180 may store information on applications displayed in a multitasking way and a display layout of execution images thereof as one multitasking application set. Additional information 2201 indicating that the information is stored through the multitasking application set setting icon may be included and stored in the multitasking application set. That the information is stored through the multitasking application set setting icon may mean that a user explicitly wishes to store the information on the applications displayed in a multitasking way and the display layout of the execution images thereof as one multitasking application set for future use.

As shown in (15-1) and (15-2) of FIG. 15, when the mobile terminal 100 simultaneously displays three application execution images in the extended display mode according to a predetermined display layout in a multitasking way, the home screen may be displayed while the three application execution images disappear according to a predetermined user command. The predetermined user command may be selected by touching the above-described home button although not shown in (15-1) of FIG. 15.

Then, as shown in (15-3) of FIG. 15, the controller 180 may store the information on the applications stored in a multitasking way and the display layout of the execution images thereof as another multitasking application set.

However, the other multitasking application set may be stored for reasons other than a reason that a user explicitly wishes to store the information for future use. Thus, the additional information 2201 may not be included and stored in the other multitasking application set.

In this method, as shown in FIG. 16, the controller 180 may store a plurality of multitasking application sets in the memory 170. The multitasking application sets may be sequentially stored in a stored time sequence. Although FIG. 16 illustrates the example in which sets 1 to 4 are stored, fewer or more sets may be stored. Here, the set 1 may be the most recently stored and the set 4 may be the oldest stored. Thereamong, the sets 2 and 4 may include the additional information 2201, and the sets 1 and 3 may not include the additional information 2201.

Hereinafter, utilization of the plurality of stored multitasking application sets will be described.

Figure 17:
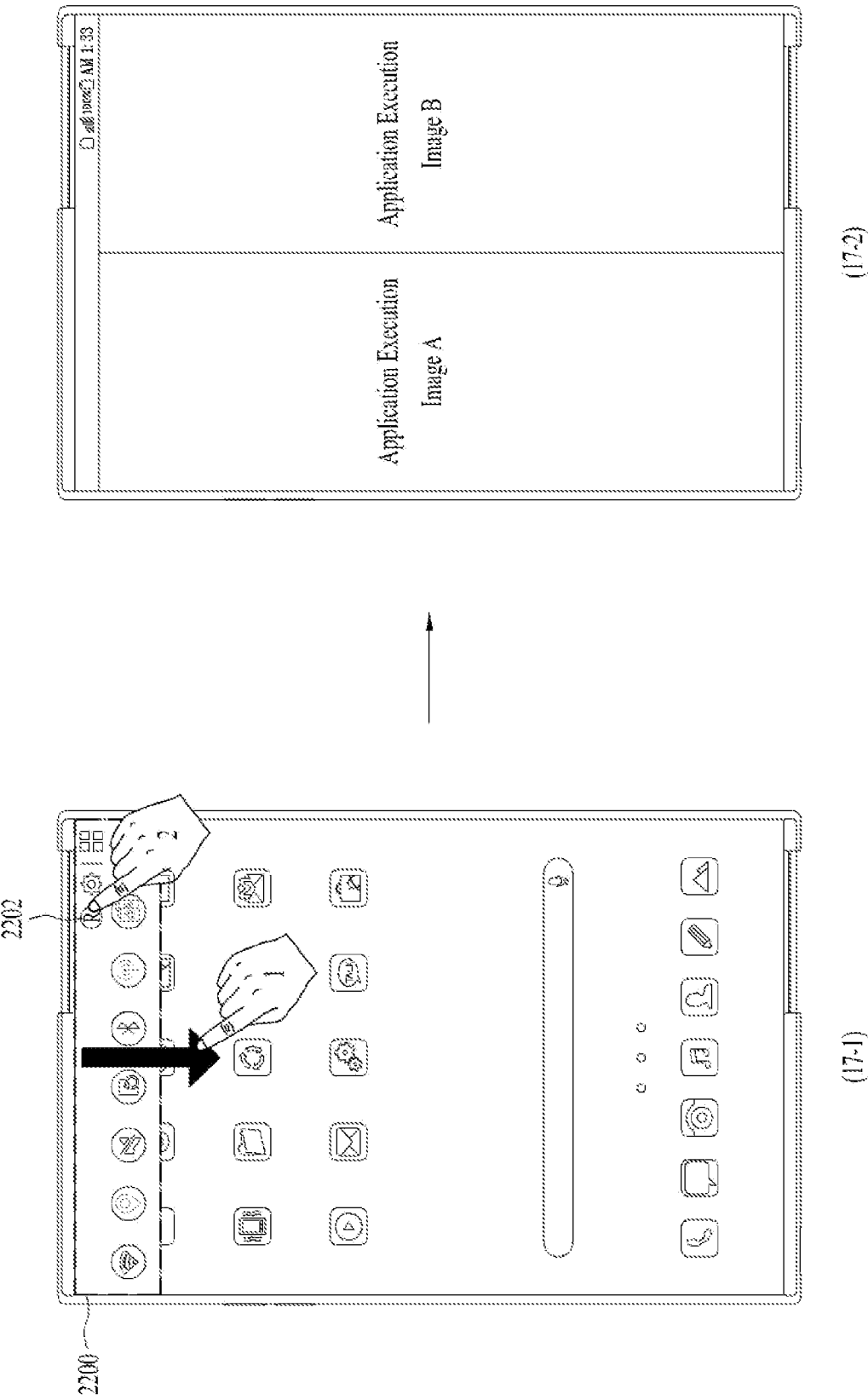
FIGS. 17 to 21 show a front display area in an extended display mode according to an embodiment of the present disclosure.

As shown in (17-1) of FIG. 17, while the home screen is displayed on the mobile terminal 100, the notification window 2200 may be displayed according to the predetermined user command.

According to an embodiment of the present disclosure, a multitasking application set call icon 2202 may be displayed within the notification window 2200. The multitasking application set call icon 2202 may not be necessarily displayed in the notification window 2200, and may be displayed in at a different position or a different window on the front display area according to another user command. While the mobile terminal displays the home screen and stores at least one multitasking application set in the memory, only when the notification window 2020 is called, the multitasking application set call icon 2201 may be displayed within the notification window 2020. Needless to say, the multitasking application set call icon 2202 may always be displayed within the notification window 2020. In this case, the multitasking application set call icon 2202 may always be displayed with the multitasking application set setting icon 2201 within the notification window 2020.

As shown in (17-2) of FIG. 17, when the multitasking application set call icon 2202 is touched and selected in a first touch gesture method, the controller 180 may perform control to display execution images of a plurality of applications corresponding to the most recently stored set 2 having the additional information 2201 among the plurality of stored multitasking application sets according to a layout corresponding to the set 2. The first touch gesture method may be a simple touch in which a pointing device such as a finger or a stylus pen is touched at a predetermined position of a display area and then the touch is released from the predetermined position within a predetermined time.

The multitasking application set call icon 2202 may be touched and selected using a second touch gesture method. The second touch gesture method may be a long touch in which a pointing device such as a finger or a stylus pen is touched at a predetermined position of a display area and then the touch is released from the predetermined position after a predetermined time.

Figure 18:
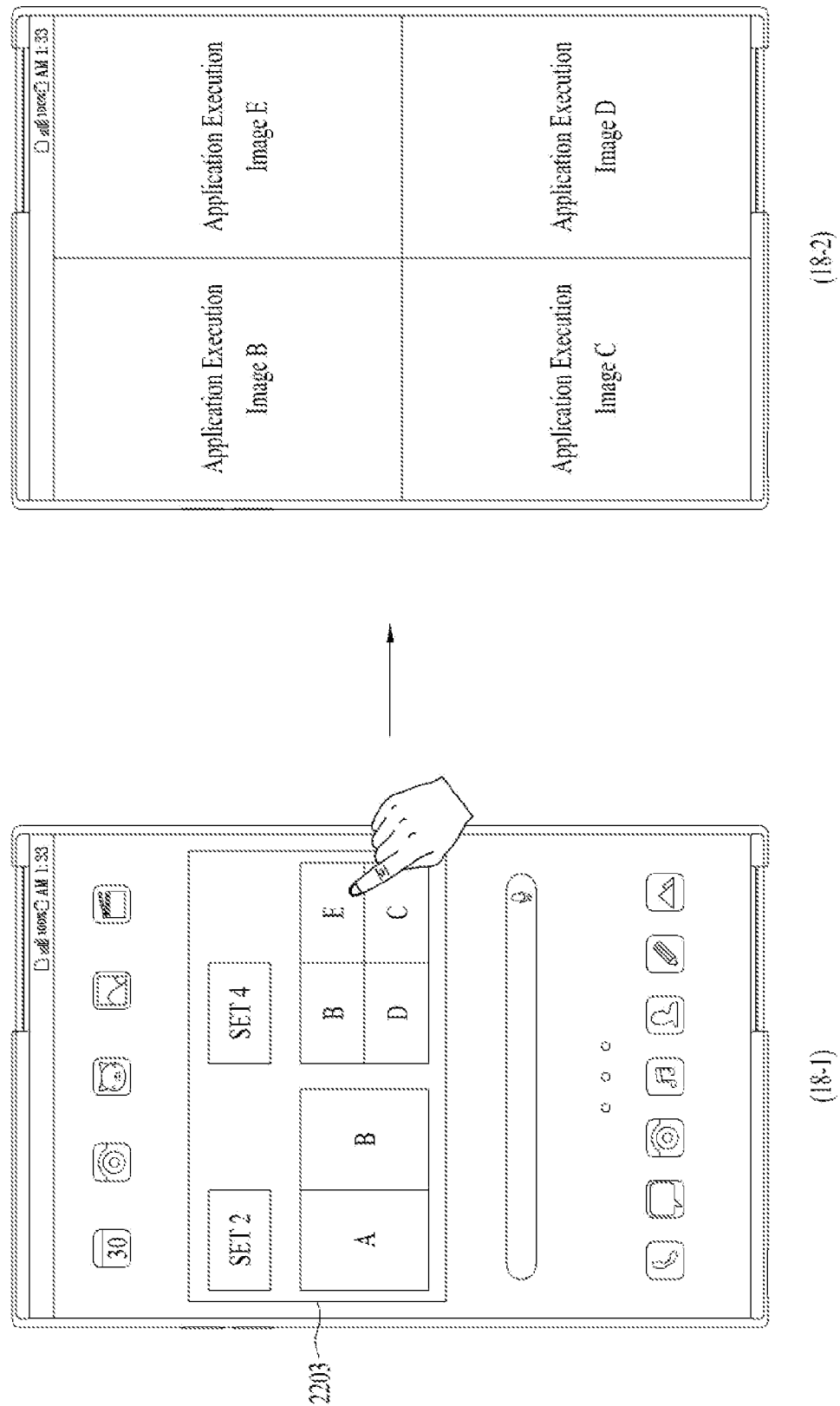

Then, as shown in (18-1) of FIG. 18, the controller 180 may perform control to call sets including the additional information 2201 among a plurality of multitasking application sets stored in the memory 170 and to display the called sets within a predetermined region 2203 of the front display area.

As shown in (18-2) of FIG. 18, when a desired multitasking application set (e.g., the set 4) is touched and selected from the predetermined region 2203, the controller 180 may perform control to display execution images of a plurality of applications corresponding to the desired multitasking application set according to a layout corresponding to the desired multitasking application set.

When the multitasking application set call icon 2202 is touched and selected using a second touch gesture method, the called multitasking application sets may be different according to whether the mobile terminal is in the extended display mode or the contracted display mode. For example, when the multitasking application set call icon 2202 is touched and selected using the second touch gesture method while the mobile terminal is in the extended display mode, only the multitasking application set stored to include the additional information may be sorted and called in the extended display mode among the all multitasking application sets stored in the memory. Alternatively, when the multitasking application set call icon 2202 is touched and selected using the second touch gesture method while the mobile terminal is in the contracted display mode, only the multitasking application set stored to include the additional information may be sorted and called in the contracted display mode among the all multitasking application sets stored in the memory.

Thus far, the multitasking application set has been described. Hereinafter, display of two or more application execution images according to a desired display layout in a multitasking way through operation S63B will be described in more detail.

As described above, in operation S61, a user command for displaying information on the recently used application may be received.

Figure 19:
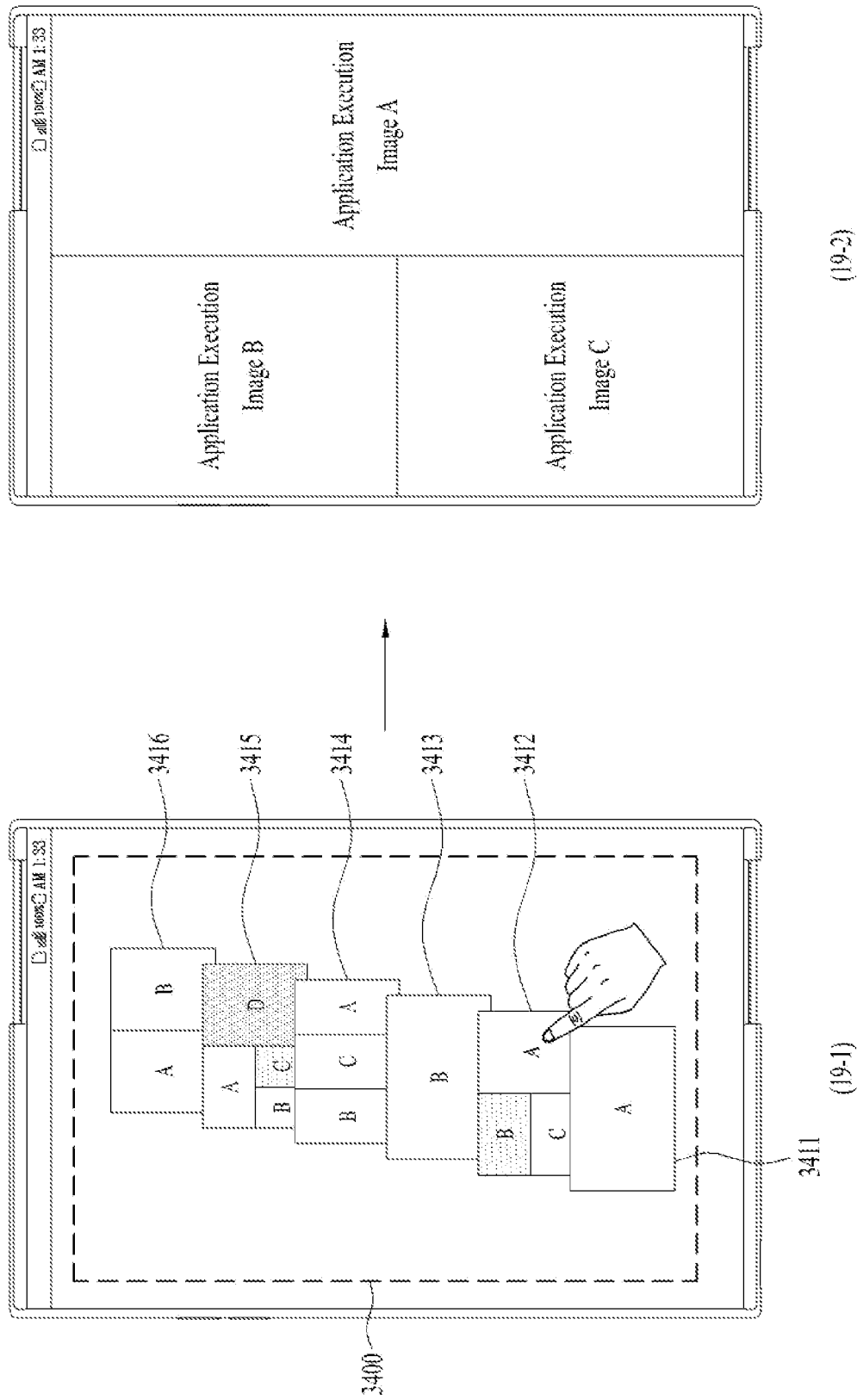

Then, as shown in (19-1) of FIG. 19, in operation S63B, the controller 180 may display one list 3400 including the information on the recently used application and the display layout information for multitasking. That is, at least one recently used applications 3411 and 3413 as the information on the recently used application may be displayed in the list 3400. The at least one recently used application may correspond to the recently used applications in the recently used application list 3200 described above with reference to FIG. 8 and may correspond to an application that has been used recently in a non-multitasking way. At least one multitasking application sets 3412, 3414, 3415, and 3416 stored in the memory described as the display layout information for multitasking may be displayed in the list 3400.

The at least one recently used applications 3411 and 3415 and the at least one multitasking application sets 3412, 3414, 3415, and 3416 may be sequentially displayed in a time sequence in which the multitasking application sets are used in the foreground. Each of the at least one multitasking application set may or may not include the additional information 2201.

The desired multitasking application set 3412 may be touched and selected in one list 3400. Then, as shown in (19-2) of FIG. 19, the controller 180 may perform control to display execution images of a plurality of applications corresponding to the desired multitasking application set according to a layout corresponding to the desired multitasking application set.

Although not shown, when one application is touched and selected among the at least one recently used application 3411 and 3415 in the one list 3400, an execution image of the selected application may be displayed in a non-multitasking way, needless to say.

With regard to the at least one multitasking application set included in the one list 3400, similarly to the above description, considering that the one list 3400 is called through operation S61 when the mobile terminal is in the extended display mode, only a multitasking application set stored in the extended display mode may be sorted and called among the all multitasking application sets stored in the memory.

Figure 20:
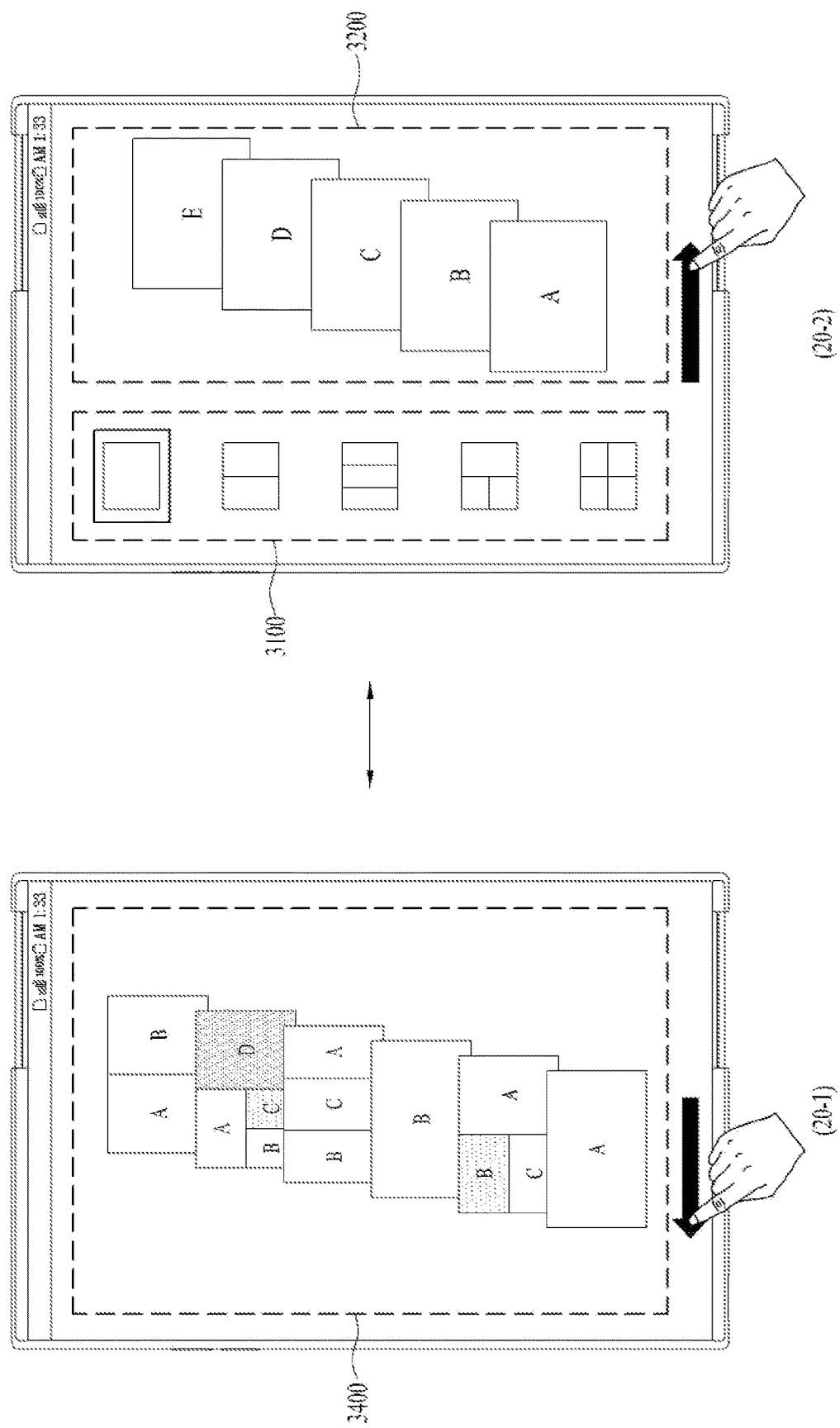

As shown in (20-1) of FIG. 20, while the one list 3400 is displayed in the front display area, a touch drag in a first direction may be performed in the front display area.

Then, the controller 180 may perform control to display the display layout list 3100 and the recently used application list 3200 instead of the one list 3400 in the front display area. The display layout list 3100 and the recently used application list 3200 may be the same as the above description.

As shown in (20-2) of FIG. 20, when the display layout list 3100 and the recently used application list 3200 are displayed in the front display area, a touch drag in a second direction may be performed in the front display area. The second direction may be opposite to the first direction.

Then, the controller 180 may perform control to display the one list 3400 instead of the display layout list 3100 and the recently used application list 3200 in the front display area.

Figure 21:
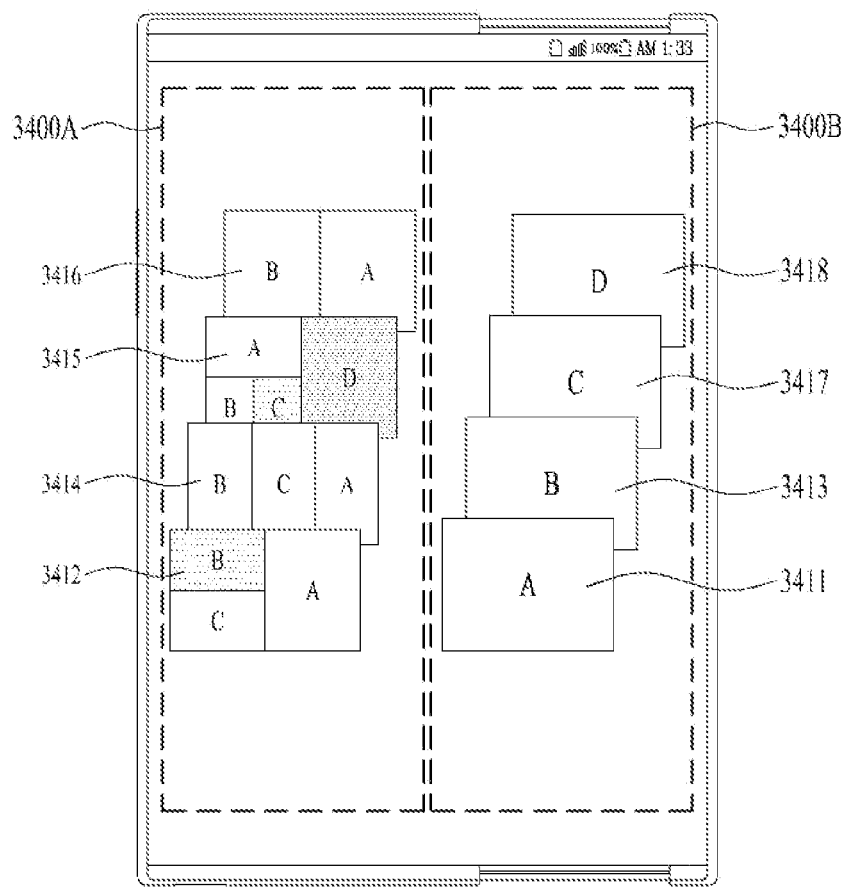

The at least one recently used application of the list 3400 and the at least one multitasking application set may be separately displayed in separate lists. That is, as shown in FIG. 21, the at least one multitasking application set 3412,

3414, 3415, and 3416 may be displayed in a first list 3400A, and the at least one recently used application 3411, 3413, 3417, and 3418 may also be displayed in a second list 3400B.

Thus far, display of the one list when the mobile terminal is in the extended display mode has been described. Hereinafter, with reference to FIG. 22, display of the one list when the mobile terminal is in the contracted display mode will be described. FIG. 22 illustrates a front display area in a contracted display mode according to an embodiment of the present disclosure.

When the mobile terminal is in the contracted display mode, the one list 3400 may also be called through operation S61. Then, as shown in (22-1) of FIG. 22, in operation S63B, the controller 180 may display one list 3500 including information on the recently used application and the display layout information for multitasking. That is, at least one recently used applications 3512 and 3514 as information on the recently used application may be displayed in the list 3500. At least one multitasking application set 3511, 3513, and 3515 stored in the above-described memory may be displayed as the display layout information for multitasking in the list 3500. The recently used applications 3512 and 3514 and the at least one multitasking application set 3511, 3513, and 3515 themselves may be the same as the description given above with reference to FIG. 19, and a detailed description thereof will be omitted.

However, with regard to the at least one multitasking application set included in the one list 3500, considering that the one list 3400 is called through operation S61 when the mobile terminal is in the contracted display mode, only a multitasking application set stored in the contracted display mode may be sorted and called among the all multitasking application sets stored in the memory.

As shown in (22-2) of FIG. 22, the one list 3500 may be switched with the recently used application list 3200 and the display layout list 3300 described with reference to FIG. 13 in response to the touch drag in the first direction or the second direction.

Figure 23:
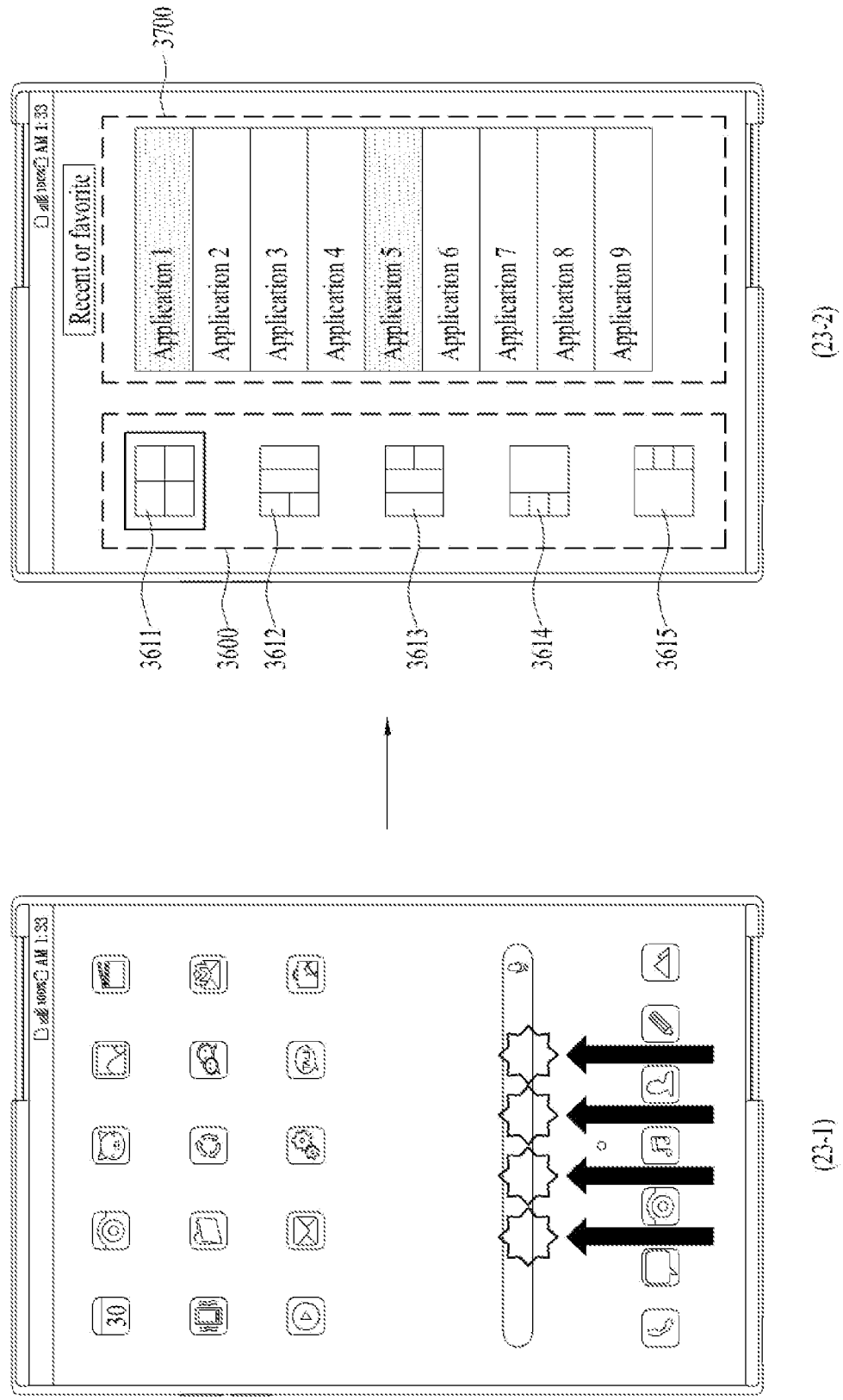
FIGS. 23 and 24 show a front display area in an extended display mode according to an embodiment of the present disclosure.
Figure 24:
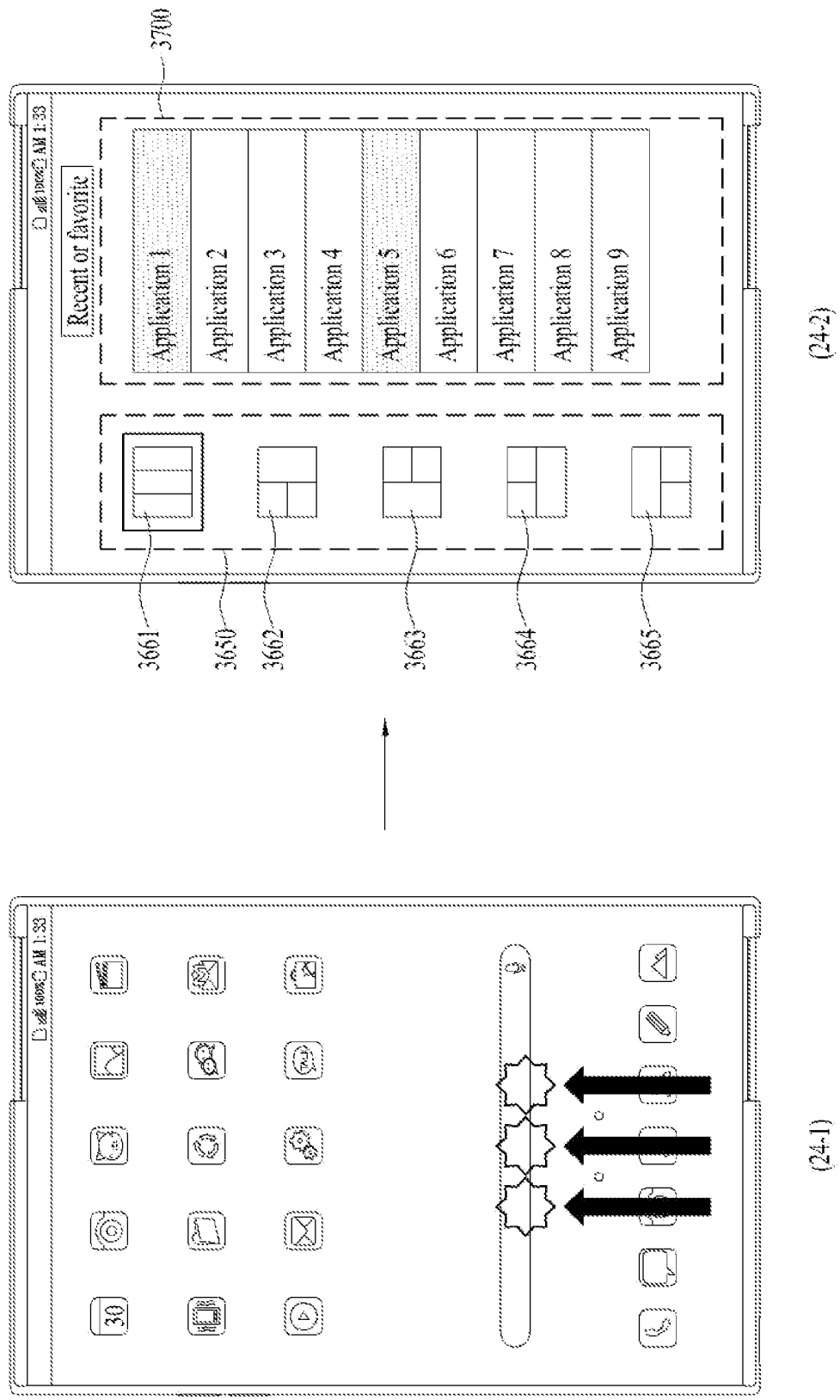

Hereinafter, with reference to FIGS. 23 and 24, display of a display layout list modified from the display layout list 3200 described with FIG. 8 will be described. FIGS. 23 and 24 show a front display area in an extended display mode according to an embodiment of the present disclosure.

As shown in (23-1) of FIG. 23, a home screen may be displayed in the front display area of the extended display mode of the mobile terminal 100.

A first user command for displaying information on the recently used application (or a preregistered preferred application) may be input to the mobile terminal [S61].

The first user command may be a first touch drag directed upward from a lower edge of the front display area. The first touch drag may be a touch gesture in which a first predetermined number (e.g., four) of fingers are simultaneously touched and dragged. The first user command may not be necessarily input only while the home screen is displayed, and may be input while another application execution image is displayed. The first touch drag may be performed in different directions from different positions.

As shown in (23-2) of FIG. 23, in operation S63A, the controller 180 may perform control to display a display layout list 3600 as the display layout information while displaying a recently used application list 3700 (or a preregistered preferred application) as information on the recently used application.

Only layout indicators 3611, 3612, 3613, 3614, and 3615 for displaying application execution images, a number of which corresponds to the first user command, may be sorted and displayed in the display layout list 3600. (23-2) of FIG. 23 illustrates an example in which the layout indicators 3611, 3612, 3613, 3614, and 3615 are for displaying application execution images, a number of which corresponds to the first predetermined number of the first touch drag. Considering that operation S63A is performed in the extended display mode, the layout indicators 3611, 3612, 3613, 3614, and 3615 may also include only indicators for a display layout suitable for the extended display mode.

As shown in (24-1) of FIG. 24, while a home screen is displayed in the front display area in the extended display mode of the mobile terminal 100, a second user command for displaying information on the recently used application (or a preregistered preferred application) may be input to the mobile terminal [S61].

The second user command may be a second touch drag directed upward from a lower edge of the front display area. The second touch drag may be a touch gesture in which a second predetermined number (e.g., three) of fingers are simultaneously touched and dragged. The first user command may not be necessarily input only while the home screen is displayed, and may be input while another application execution image is displayed. The second touch drag may be performed in different directions from different positions.

Then, as shown in (24-2) of FIG. 24, in operation S63A, the controller 180 may perform control to display a display layout list 3650 as the display layout information while displaying the recently used application list 3700 (or a preregistered preferred application) as information on the recently used application.

Only layout indicators 3661, 3662, 3663, 3664, and 3665 for displaying application execution images, a number of which corresponds to the second user command, may be sorted and displayed in the display layout list 3650. (24-2) of FIG. 24 illustrates the case in which the layout indicators 3661, 3662, 3663, 3664, and 3665 are for displaying application execution images, a number of which corresponds to the second predetermined number of the second touch drag. Considering that operation S63A is performed in the extended display mode, the layout indicators 3661, 3662, 3663, 3664, and 3665 may also include only indicators for a display layout suitable for the extended display mode.

A plurality of application execution images may be displayed in a multitasking way by touching and selecting a desired layout indicator in the display layout lists 3600 and 3650, and then sequentially touching and selecting desired applications corresponding to the first predetermined number or the second predetermined number in the recently used application list 3700, which has been described above with reference to FIG. 10, and thus a detailed description thereof is omitted here.

Hereinafter, with reference to FIGS. 25 to 30, movement and/or rearrangement of application execution images displayed in the front display area will be described. FIGS. 25 to 30 illustrate a front display area in an extended display mode according to an embodiment of the present disclosure.

Figure 25:
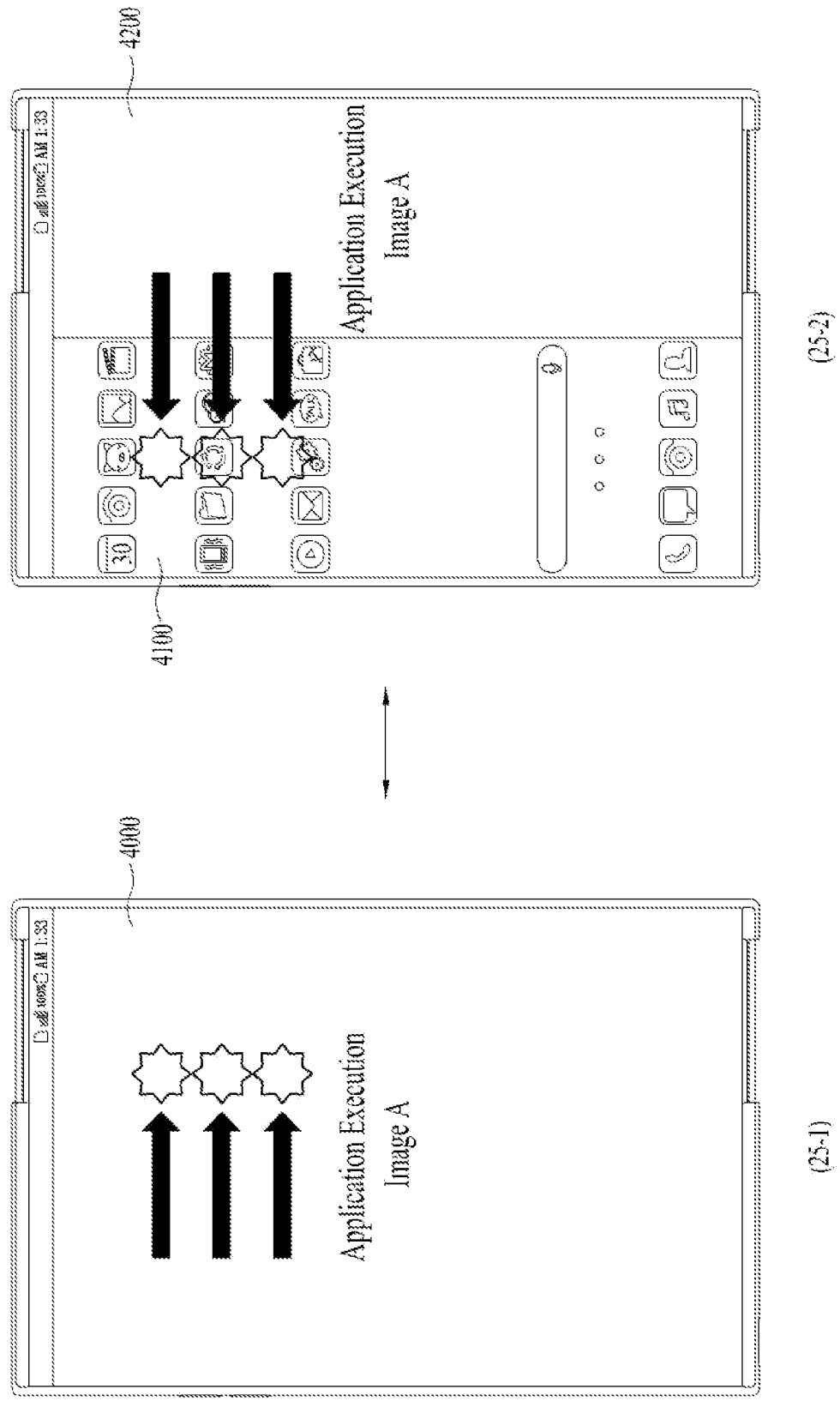
FIGS. 25 to 30 illustrate a front display area in an extended display mode according to an embodiment of the present disclosure.

As shown in (25-1) of FIG. 25, an application execution image A may be displayed as an entire image 4000 in the front display area of the mobile terminal.

In this case, the first touch drag in a first direction (e.g., from left to right) may be performed in front display area. The first touch drag may be a touch gesture in which the first predetermined number (e.g., three) of fingers are simultaneously touched and dragged.

Then, as shown in (25-2) of FIG. 25, the controller 180 may divide the front display area into a left area 4100 and a right area 4200 and may then perform control to display the home screen in the left area 4100 and to display the application execution image A in the right area 4200.

When the home screen is displayed in the left area 4100 and the application execution image A is displayed in the right area 4200, the first touch drag in the second direction may be performed. The second direction may be opposite to the first direction.

Then, as shown in (25-2) of FIG. 25, the controller 180 may perform control to display the application execution image A as the entire image 4000 in the front display area of the mobile terminal.

When the home screen is displayed in the left area 4100 and the application execution image A is displayed in the right area 4200, an application icon B may be touched and selected in the home screen.

Figure 26:
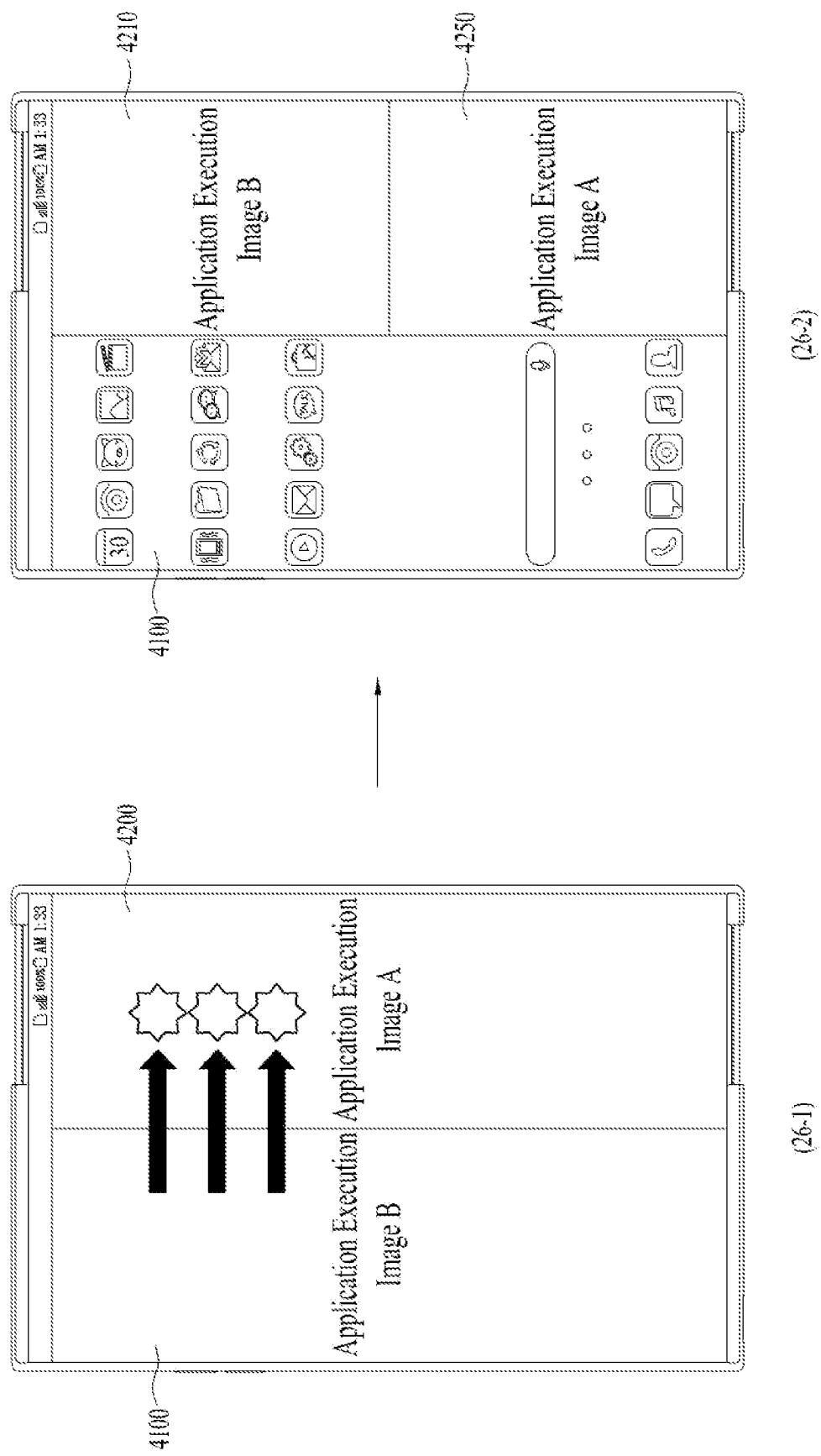

Then, as shown in (26-1) of FIG. 26, the controller 180 may perform control to display the application execution image B in the left area 4100 and to display the application execution image A in the right area 4200.

In this case, the first touch drag in the first direction in the upper area of the front display area may be performed across the left area 4100 and the right area 4200.

Then, as shown in (26-2) of FIG. 26, the controller 180 may divide the right area 4200 into an upper-right area 4210 and a lower-right area 4250 and may then perform control to display the application execution image B in the upper-right area 4210 and to display the application execution image A in the lower-right area 4250. The controller 180 may perform control to display the home screen in the left area 4100.

That is, the application execution image B may be moved to the upper-right area 4210 from the left area 4100.

The application execution image B may be moved to the lower-right area 4250 from the left area 4100, which will be described with reference to FIG. 27.

Figure 27:
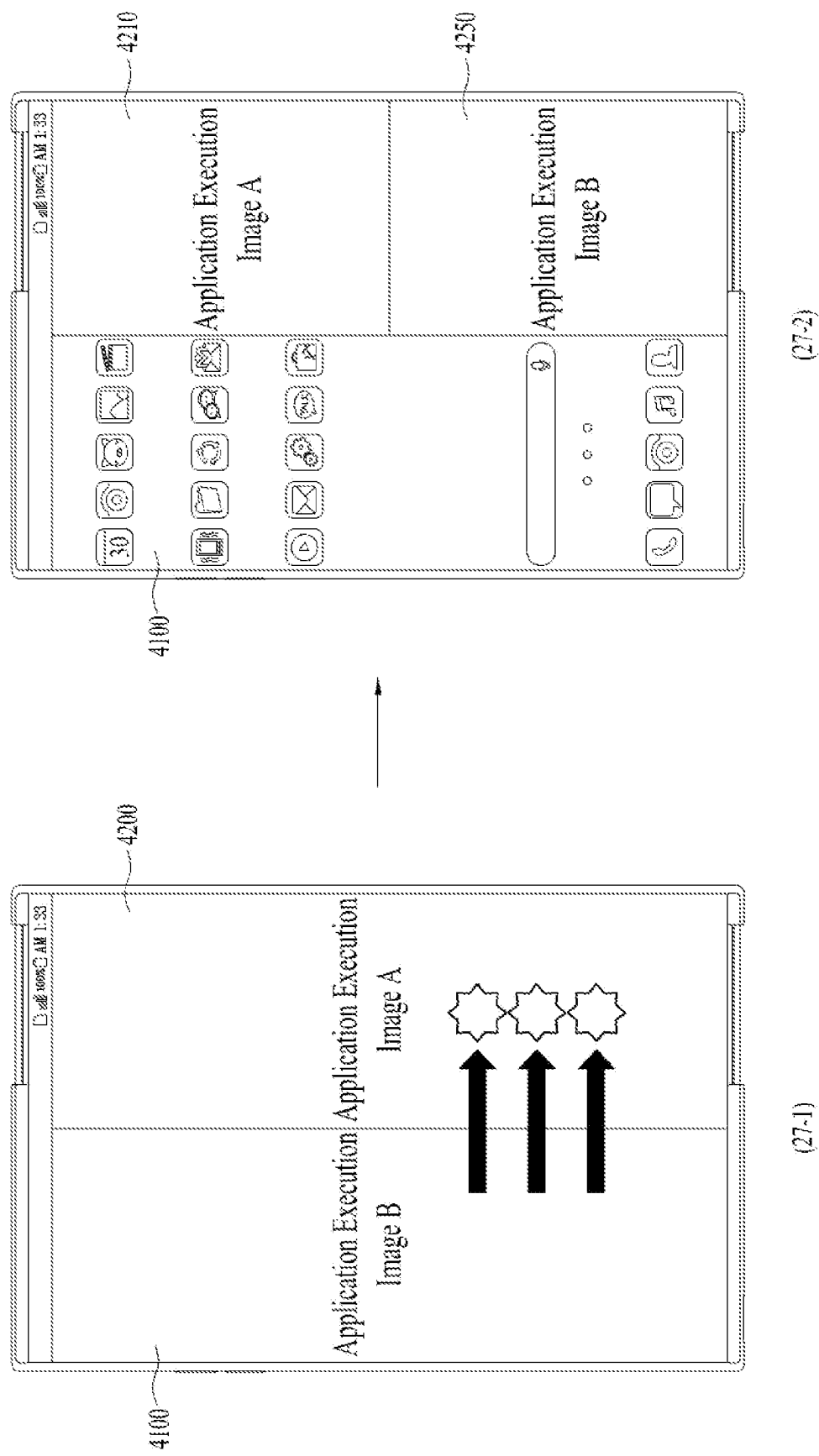

As shown in (27-1) of FIG. 27, when the application execution image B is displayed in the left area 4100 and the application execution image A is displayed in the right area 4200, the first touch drag in the first direction in the lower area of the front display area may be performed across the left area 4100 and the right area 4200.

Then, as shown in (27-2) of FIG. 27, the controller 180 may divide the right area 4200 into the upper-right area 4210 and the lower-right area 4250 and may then may perform control to display the application execution image A in the upper-right area 4210 and to display the application execution image B in the lower-right area 4250. The controller 180 may perform control to display the home screen in the left area 4100.

That is, the application execution image B may be moved to the lower-right area 4250 from the left area 4100.

Movement and/or rearrangement of the application execution image will be described with reference to FIGS. 28 to 30.

Figure 28:
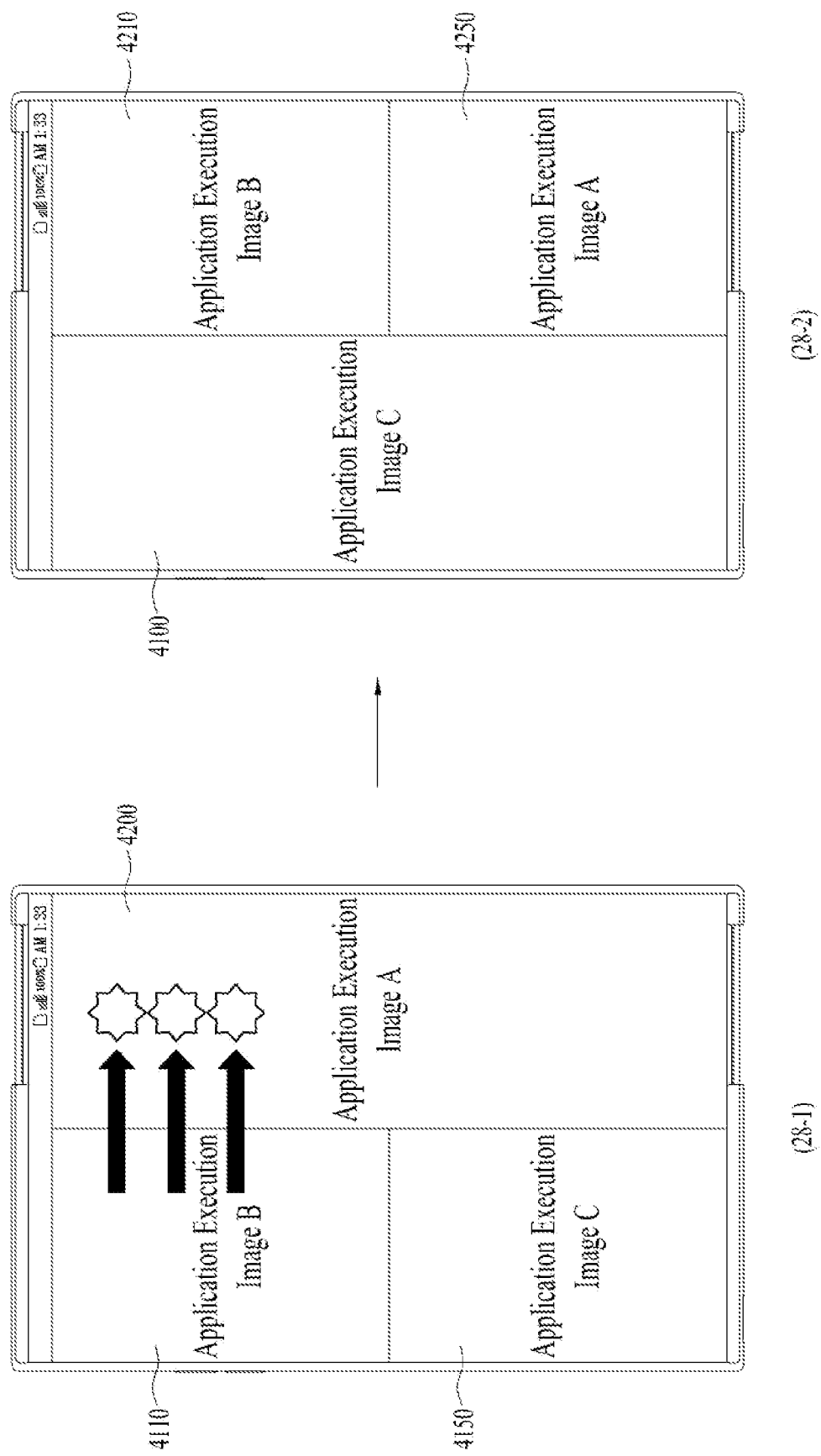

As shown in (28-1) of FIG. 28, the front display area may be divided into an upper-left area 4110, a lower-left area 4150, and the right area 4200, the application execution image B may be displayed in the upper-left area 4110, an application execution image C may be displayed in the lower-left area 4150, and the application execution image A may be displayed in the right area 4200.

In this case, the first touch drag in the first direction in the front display area may be performed across the upper-left area 4110 and the right area 4200.

Then, as shown in (28-2) of FIG. 28, the controller 180 may divide the right area 4200 into the upper-right area 4210 and the lower-right area 4250 while integrating the upper-left area 4110 and the lower-left area 4150 into the left area 4100 and may then perform control to display the application execution image C in the left area 4100, to display the application execution image B in the upper-right area 4210, and to display the application execution image A in the lower-right area 4250.

That is, the application execution image B may be moved to the upper-right area 4210 from the upper-left area 4110, the application execution image C may be moved to the left area 4100 from the lower-left area 4150, and the application execution image A may be moved to the lower-right area 4250 from the right area 4200.

Figure 29:
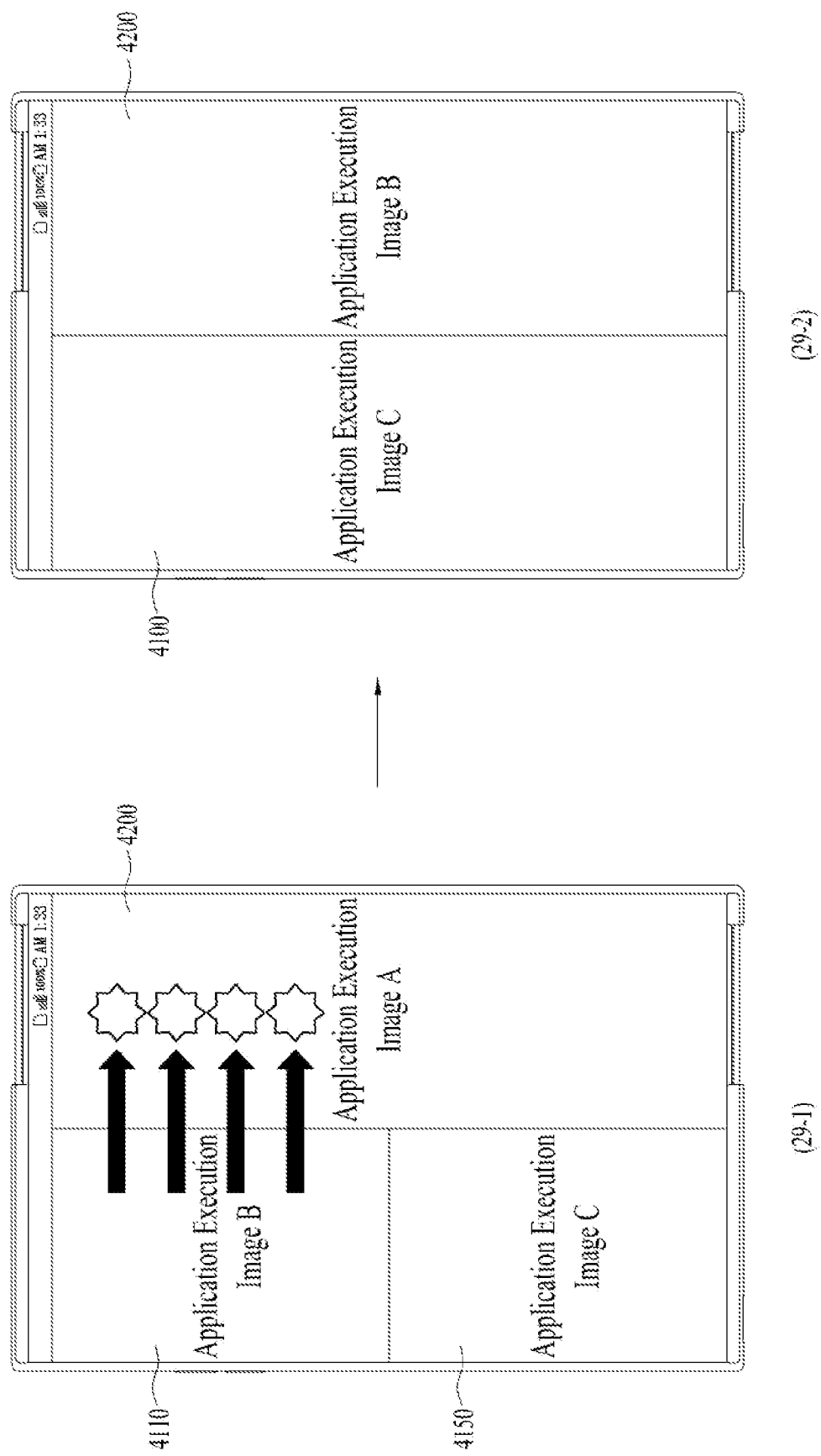

As shown in (29-1) of FIG. 29, when the application execution image B is displayed in the upper-left area 4110, the application execution image C is displayed in the lower-left area 4150, and the application execution image A is displayed in the right area 4200, the second touch drag in the first direction in the front display area may be performed across the upper-left area 4110 and the right area 4200.

Then, as shown in (29-2) of FIG. 29, the upper-left area 4110 and the lower-left area 4150 may be integrated into the left area 4100, and then the application execution image A may be displayed in the right area 4200 while the application execution image C is displayed in the left area 4100.

That is, the application execution image B may be moved to the right area 4200 from the upper-left area 4110, the application execution image C may be moved to the left area 4100 from the lower-left area 4150, and the application execution image A may not be displayed any longer.

Figure 30:
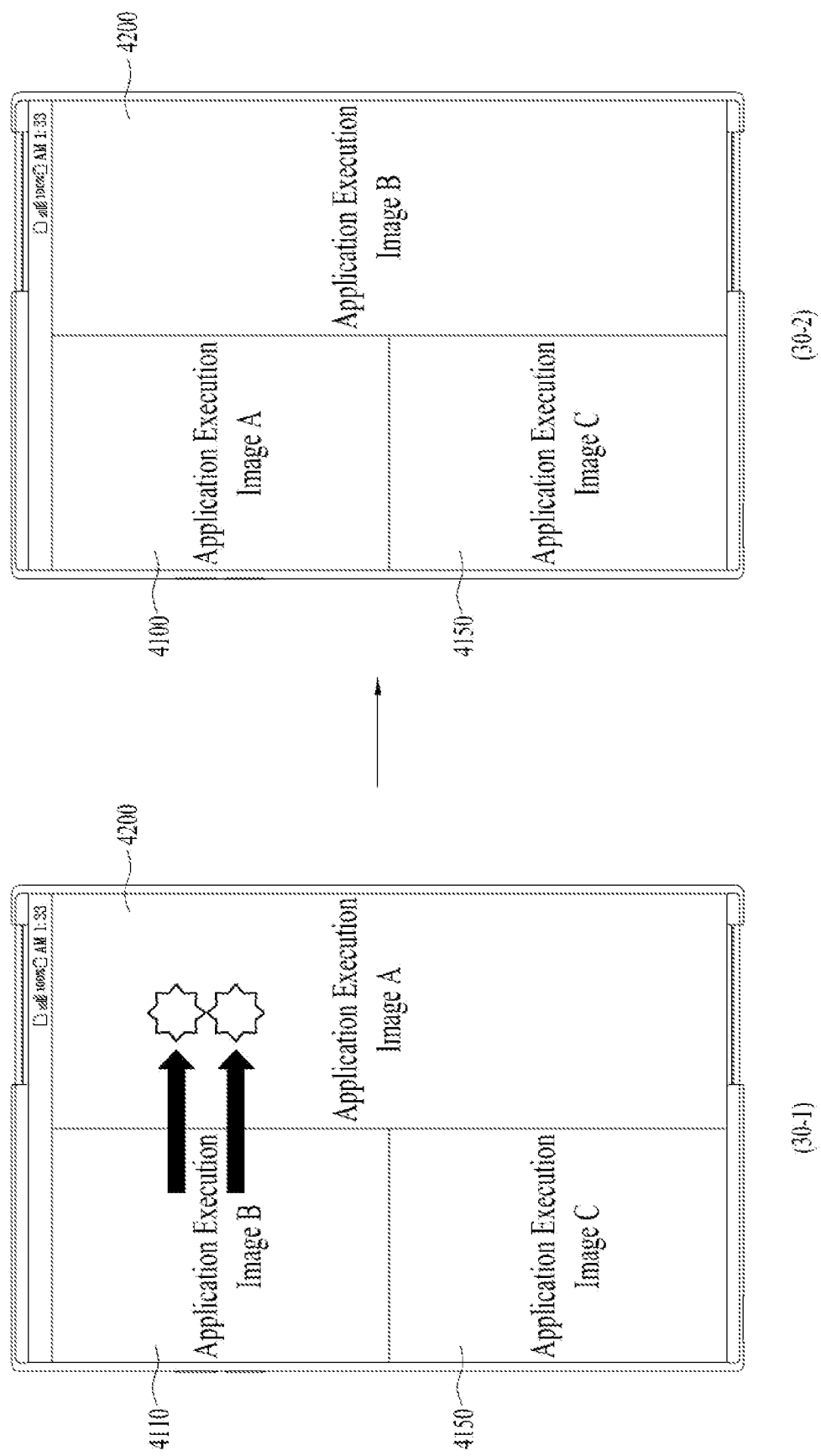

As shown in (30-1) of FIG. 30, when the application execution image B is displayed in the upper-left area 4110, the application execution image C is displayed in the lower-left area 4150, and the application execution image A is displayed in the right area 4200, a third touch drag in the first direction in the front display area may be performed across the upper-left area 4110 and the right area 4200. The third touch drag may be a touch gesture in which a third predetermined number (e.g., two) of fingers are simultaneously touched and dragged.

As shown in (30-2) of FIG. 30, the controller 180 may perform control to continuously display the application execution image C in the lower-left area 4150, but may perform control to display the application execution image B in the right area 4200 while displaying the application execution image A in the upper-left area 4110.

That is, the application execution image B may be moved to the right area 4200 from the upper-left area 4110, and the application execution image A may be moved to the upper-left area 4110 from the right area 4200.

Although not shown, the controller 180 may perform control to display the application execution image C in the upper-left area 4110, to display the application execution image A in the lower-left area 4150, and to display the application execution image B in the right area 4200 in response to the third touch drag.

That is, the application execution image B may be moved to the right area 4200 from the upper-left area 4110, the application execution image A may be moved to the lower-left area 4150 from the right area 4200, and the application execution image C may be moved to the upper-left area 4110 from the lower-left area 4150.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A mobile terminal comprising:
a body;
a display coupled to the body to allow a display area seen from a front of the body to be variable as being switched between an extended display mode and a contracted display mode; and
a controller configured to display information on a recently used application with display layout information for multitasking,
wherein the controller performs control to display a recently used application list as the information on the recently used application and to display a display layout list as the display layout information,
wherein at least one display layout included in the display layout list includes only a display layout suitable for a current mode of the extended display mode and the contracted display mode, and
wherein, in response to a desired display layout being selected from the display layout list and applications, a number of which corresponds to the desired display layout, being selected from the recently used application list, the controller performs control to display execution images of the selected applications according to the desired display layout.

2. The mobile terminal of claim 1, wherein the controller performs control to display one list including the information on the recently used application and the display layout information for multitasking.

3. The mobile terminal of claim 2, wherein two or more applications, which have been simultaneously executed in a multitasking way, and display layout information of execution images for the two or more applications are stored as one multitasking application set.

4. The mobile terminal of claim 3, wherein at least one multitasking application set is listed in the one list in an order of execution time.

5. The mobile terminal of claim 4, wherein the controller performs control to display execution images of two or more applications corresponding to a desired multitasking application set according to a display layout corresponding to the desired multitasking application set in response to the desired multitasking application set being selected from the one list.

6. The mobile terminal of claim 4, wherein the controller performs control to list at least one application, which has been executed in a non-multitasking way, together with the at least one multitasking application set in the list in an order of execution time.

7. The mobile terminal of claim 4, wherein the controller performs control to list at least one application, which has been executed in a non-multitasking way, in separate lists in an order of execution time.

8. The mobile terminal of claim 3, wherein the at least one multitasking application set of the list includes only a multitasking application set that has been executed in a current mode of the extended display mode and the contracted display mode.

9. The mobile terminal of claim 3, wherein the at least one multitasking application set of the list includes only a multitasking application set preselected by a user.

10. The mobile terminal of claim 1, wherein:
the body includes a first frame, and a second frame to be extended from the first frame and to be contracted to the first frame;
the display includes a flexible display surrounding the front, side, and back surfaces of the body; and
the controller performs control to operate in the extended display mode as the second frame is extended and to operate in the contracted display mode as the second frame is contracted.

11. The mobile terminal of claim 10, wherein the flexible display is coupled to the body to increase the display area seen from the front of the body in the extended display mode by moving a display part, which is positioned on at least the side surface of the body, to the front of the body as the second frame is extended.

12. The mobile terminal of claim 11, wherein the flexible display is coupled to the body to allow a display part, which is positioned on the rear surface of the body, to be moved to the front of the body through the side surface of the body as the display part, which is positioned on the side surface of the body, is moved to the front of the body.

13. The mobile terminal of claim 12, wherein the flexible display is coupled to the body to reduce the display area seen from the front of the body by moving the display part, which is positioned on the front of the body, to the side surface of the body or moving the display part, which is positioned on the front of the body, to the rear surface of the side surface as the second frame is contracted.

14. The mobile terminal of claim 10, further comprising:
a driver configured to move the second frame via sliding extension or sliding contraction.

15. The mobile terminal of claim 10, further comprising:
a side frame configured to cover the flexible display surrounding the side surface of the body.

16. A mobile terminal comprising:
a body;
a display coupled to the body to allow a display area seen from a front of the body to be variable as being switched between an extended display mode and a contracted display mode; and
a controller configured to display information on a recently used application with display layout information for multitasking,
wherein the controller performs control to display a recently used application list as the information on the recently used application and to display a display layout list as the display layout information, and
wherein the controller performs control to display the recently used application list and the display layout list in response to a predetermined touch gesture, wherein the display layout list includes only a display layout for applications, a number of which corresponds to the predetermined touch gesture.

17. A control method of a mobile terminal including a body, and a display coupled to the body to allow a display area seen from a front of the body to be variable as being switched between an extended display mode and a contracted display mode, the method comprising:

receiving a user command for displaying information on a recently used application; and performing control the information on the recently used application with the display layout information for multitasking, wherein a recently used application list is displayed as the information on the recently used application, and a display layout list is displayed as the display layout information, wherein at least one display layout included in the display layout list includes only a display layout suitable for a current mode of the extended display mode and the contracted display mode, and wherein, in response to a desired display layout being selected from the display layout list and applications, a number of which corresponds to the desired display layout, being selected from the recently used application list, the controller performs control to display execution images of the selected applications according to the desired display layout.

* * * * *